United States Patent [19]

Hauck

[11] Patent Number: 5,405,153
[45] Date of Patent: Apr. 11, 1995

[54] MUSICAL ELECTRONIC GAME

[76] Inventor: Lane T. Hauck, 5346 Bragg St., San Diego, Calif. 92122

[21] Appl. No.: 30,698

[22] Filed: Mar. 12, 1993

[51] Int. Cl.$^6$ ............................................. A63B 71/06
[52] U.S. Cl. ................................. 273/460; 273/429; 273/432; 434/319; 434/321; 84/470 R; 84/609
[58] Field of Search ................ 273/85 G, 138 A, 439, 273/429, 460, 430, 432; 434/319, 321, 322; 84/470 R, 600, 609, 649

[56] References Cited

U.S. PATENT DOCUMENTS

| | | | |
|---|---|---|---|
| 4,336,935 | 6/1982 | Goldfarb | 273/460 |
| 4,358,278 | 11/1982 | Goldfarb | 434/337 |
| 4,572,509 | 2/1986 | Sitrick | 273/85 G |
| 4,690,025 | 9/1987 | Hines et al. | 84/1.18 |
| 4,731,847 | 3/1988 | Lybrook et al. | 381/51 |
| 4,770,416 | 9/1988 | Shimizu et al. | 273/433 X |
| 4,813,330 | 3/1989 | Hines et al. | 84/483 A |
| 4,958,835 | 9/1990 | Tashiro et al. | 273/85 G |
| 5,059,126 | 10/1991 | Kimball | 434/308 |
| 5,106,097 | 4/1992 | Levine | 273/237 |
| 5,219,291 | 6/1993 | Fong et al. | 434/323 |

Primary Examiner—Benjamin H. Layno
Assistant Examiner—Kerry Owens
Attorney, Agent, or Firm—Bernard L. Kleinke; Jerry R. Potts

[57] ABSTRACT

The game includes a device for randomly selecting a sequence of musical notes for game playing purposes. Another device enables a player to preview a recognition sequence of a portion of the sequence of musical notes prior to game play. A switch device actuated by the player causes a signal to be generated indicative that the player identified the recognition sequence of notes embedded within sequence of musical notes during game play.

38 Claims, 10 Drawing Sheets

MUSICAL ELECTRONIC GAME

TECHNICAL FIELD

The present invention relates in general to an electronic game device, and a method of using it. More particularly, the present invention relates to sight and sound electronic game device and method of using it either alone or with one or more other similar devices.

BACKGROUND ART

Electronic games are well known and very popular. Many electronic games utilize a display device to present colorful and fast-moving graphics to challenge a player's visual and motor skills. While these games include sound generating means for simulating game sound effects, the role of such sound effects is to accent the action of the game, instead of taking part in the game action or strategy.

Therefore, it would be innovative and highly desirable to have a new and improved electronic game that makes use of sound as a strategic game element, where recognition of musical sounds plays a dominant role in the play of the game rather than serving merely to accent other actions. Such a game should also be readily playable by persons without sight.

It would be further desirable if, while playing the game, the player were able to develop and improve his or her ability to recognize properly tuned notes of the scale in various patterns and in various keys, thus stimulating ear training. Therefore, it would be highly desirable to have a new and improved electronic game that helps a user recognize properly tuned notes of the scale in various patterns and in various keys.

Additionally, it would be very desirable if two or more game units could be connected together, allowing multiple players to play competitively. Such a competitive arrangement would be most advantageously implemented if the multiple-player game were enabled by simply connecting a cabling or wireless communication arrangement between identical game units. Such a game should be compact, portable and relatively inexpensive.

Therefore, it would be highly desirable to have a new and improved electronic game that can be played by one, two or more players. Such a game should also be compact, portable and relatively inexpensive.

DISCLOSURE OF INVENTION

Therefore, the principal object of the present invention is to provide a new and improved electronic game device that makes use of sound as a strategic game element, where recognition of musical sounds plays a dominant role in the play of the game rather than serving merely to accent other actions.

Another object of the present invention is to provide such a new and improved electronic game device that develops the ability of a player to recognize properly tuned notes of the scale in various patterns and in various keys, thus stimulating ear training.

A further object of the present invention is to provide such a new and improved electronic game device that can be played either alone or played simultaneously with one or more other similar devices.

Briefly, the above and further objects of the present invention are realized by providing a new and improved sight and sound electronic game device which is entertaining and helps a user to facilitate his or her ability to recognize properly tuned notes of the scale in various patterns, and in various keys to stimulated sound recognition.

The game includes a device for randomly selecting a sequence of musical notes for game playing purposes. Another device enables a player to preview a recognition sequence of a portion of the sequence of musical notes prior to game play. A switch device actuated by the player causes a signal to be generated indicative that the player identified the recognition sequence of notes embedded within sequence of musical notes during game play.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
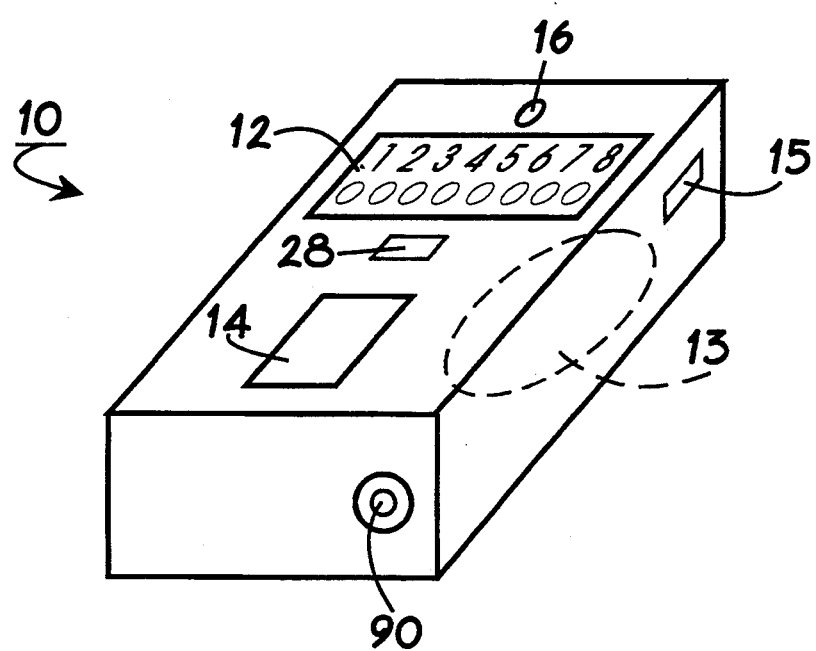
FIG. 1 is a diagrammatic view of a musical electronic game which is constructed in accordance with the present invention.

Referring now to the drawings and more particularly to FIG. 1 thereof, there is shown an electronic game device 10, which is constructed in accordance with the present invention.

Figure 2:
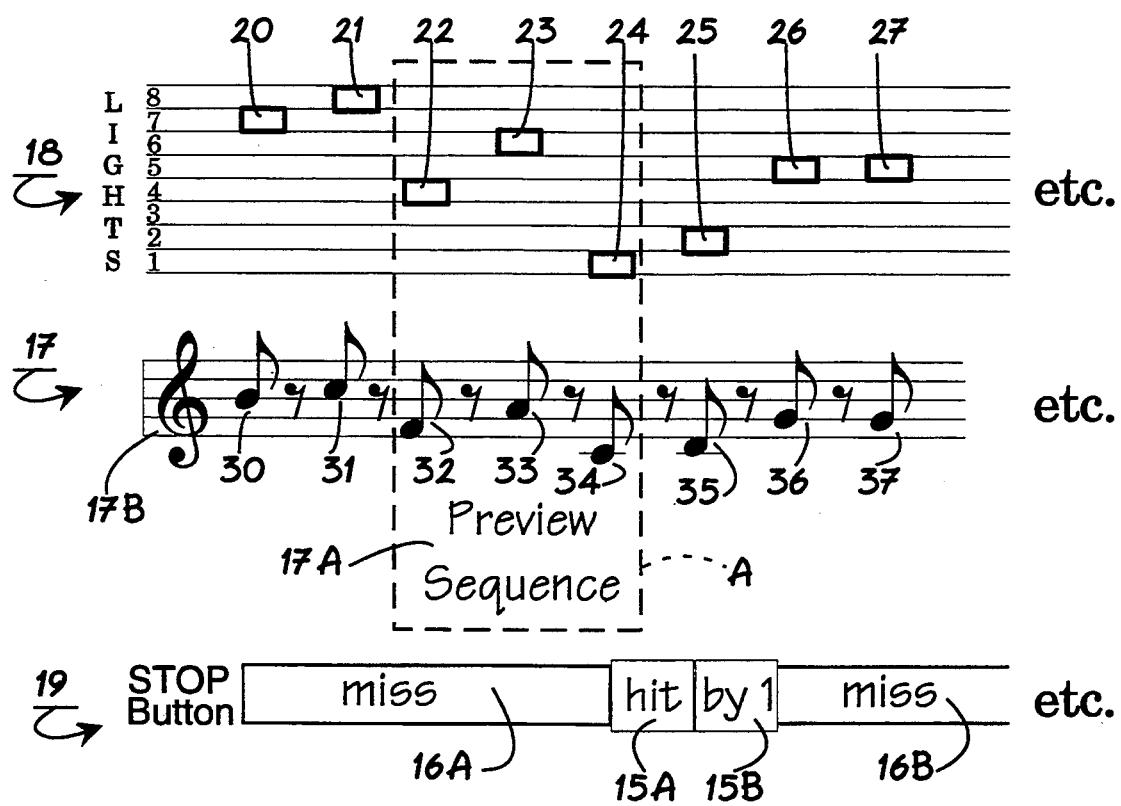
FIG. 2 is a symbolic music timing diagram of a sequence of musical notes and corresponding light illuminations which might be encountered during a typical round of the game play illustrated with possible player responses.

The electronic game device 10 includes a microprocessor 11 (FIG. 3) for controlling game play, and a loudspeaker 13 for emitting audible sounds of a random melodic multiple note sequence, such as a sequence 17 (FIG. 2), to be recognized by a player (not shown) during the course of game play. A group 12 of lights 12A–H (FIG. 3) provide a visual indication to the player of the multiple note sequence, such as the sequence 17 (FIG. 2). A single momentary pushbutton switch 14 enables the player to initiate game action by causing a preview sequence, such as a PREVIEW SEQUENCE 17A, (FIG. 2) to be heard on the loudspeaker 13 and displayed by selected ones of the lights 12A–H. In this regard, the PREVIEW SEQUENCE 17A consists of at least three notes which may be displayed by selected ones of the lights in the group 12. The momentary pushbutton switch 14 causes the PREVIEW SEQUENCE 17A to be repeated a single time for each actuation. Game play begins when the player fails to actuate the momentary pushbutton switch 14 after reviewing the PREVIEW SEQUENCE 17A at least once. A light actuation switch 28 enables a player to play the game with or without actuating the light in the group 12.

Game Play

Considering now the operation of the electronic game device 10 with reference to FIGS. 1–2, a musical chart 17B illustrates a series of musical notes in a given melody line, such as the melody line 17, where a portion of the melody line 17 consists of notes 30–37. During the course of a single round of play, the melody line notes, beginning with notes 30–37, are heard by a user as audible sounds produced by the loudspeaker 13 and seen by a user as a sequence of visual indications as selected ones of the lights 12A–12H are illuminated provided switch 28 is activated. The melody line 17, as will be explained hereinafter, is automatically changed during each round of play to provide the player or players with different note sequences and faster rhythms to increase recognition difficulty.

In order to assist in understanding of the operation of the game device 10, a timing diagram 19 is provided for illustrating the various events that may occur in the course of a single round of play. In this regard, the object of the game is for a player to recognize a three note sequence within the melody line, such as the three note PREVIEW SEQUENCE 17A, consisting of the notes 32, 33 and 34. A player indicates recognition, by actuating the momentary pushbutton switch 14 during the time the melody line 17 is playing.

A player, may or may not recognize the three note sequence during a round of play. Thus, for example, if the player actuates the momentary pushbutton switch 14 too soon or too late, recognition is faulty or considered a miss, such as a miss 16A and a miss 16B respectively. Immediate recognition before any other note outside of the sequence 17A is played is considered a hit 15A, and delayed recognition within one note after the sequence 17A has played is considered a miss by one note indicated generally at 15B.

To further assist in understanding the operation of the device 10, a light illumination sequence 18 (FIG. 2) is shown that illustrates which of the numbered (1–8) lights 12A–12H respectively are illuminated during the time the melody line notes 30–37 are heard. For example, when note 30 is heard, light (#7) 12G is illuminated as illustrated by an illumination state 20. Other illumination states 21–27 are also illustrated in sequence 18 to show which lights are illuminated during the time the melody line notes 31–37 are heard. In this regard, for note 31, light (#8) 12H is illuminated, as illustrated by state 21; for note 32, light (#4) 12D is illuminated, as illustrated by state 22; etc.

Considering now the play of a game, a game consists of multiple rounds. Before the start of a round, the player actuates the momentary pushbutton switch 14 to audition or preview a melodic fragment consisting of three notes which are selected from a musical scale of eight notes. The player may actuate momentary pushbutton switch 14 as many times as desired to commit the three note sequence to memory. The dotted box "A" in FIG. 2 illustrates the PREVIEW SEQUENCE 17A, whereby every time momentary pushbutton switch 14 is actuated, the notes 32, 33 and 34 are played in sequence through loudspeaker 13. The notes are separated by silent intervals or "rests" of equal duration to the notes. Also as notes 32–34 are heard, corresponding lights may or may not be illuminated depending on the on/off position of switch 28, as shown by states 22–24 respectively. Thus a player hears the notes "F-A-C" and sees the light pattern "4-6-1" every time the momentary pushbutton switch 14 is activated. The light actuation switch 28 enables a player to hear the melody line with or without accompanying lights. In this regard, the player is free to manipulate switch 28 during the PREVIEW SEQUENCE 17A and hear the three preview notes either with or without the accompanying lights.

When the player feels that the three-note audible PREVIEW SEQUENCE 17A is adequately memorized, the player initiates a round by not actuating the momentary pushbutton switch 14 for a predetermined period of time. The predetermined period of time is between about 1 second and 60 seconds. A more preferred period of time is between about 2 seconds and 30 seconds, while the most preferred period of time is between about 3 seconds and 10 seconds.

After the lapse of the predetermined time period, the melody 17 begins to play through loudspeaker 13. Also, after the predetermined period of time has elapsed, the state of switch 28 is stored by the microprocessor 11 and the lights are either activated, illuminating in step with the melody line 17, or deactivated (all off) during the round according to the ON or OFF state of switch 28. This prevents a player from changing his or her mind regarding the use of the lights 12 during a round since manipulation of switch 28 has no effect once the round has started.

During a round, the melodic sequence of up to thirty notes is heard in loudspeaker 13. For clarity, only the first eight notes of the melody 17 are shown in FIG. 2. At some point in melody 17, the three notes heard during the PREVIEW SEQUENCE 17A are imbedded. The goal of the player is to identify the appearance of the previously memorized PREVIEW SEQUENCE 17A which were heard and memorized preceding the round. When the player thinks he or she has recognized the PREVIEW SEQUENCE 17A, the player actuates the momentary pushbutton switch 14 which causes the melody 17 to stop playing and a score value for the round to be awarded. Depending on the accuracy with which the player identifies the three note sequence 17A, different point values are possible. The scoring can be best understood by referring to time-line 19 (FIG. 2), where various actuation times are shown where a player might actuate the momentary pushbutton switch 14. In this regard, four actuation time intervals are shown in time-line 19, as follows:

A. If the player actuates the momentary pushbutton switch 14 any time after the first note 30 of melody 11 is played but prior to the playing of the third note 34 of the PREVIEW SEQUENCE 17A, the "miss" 16A is scored since the three notes of the PREVIEW SEQUENCE 17A have not yet been heard.

B. If the player actuates the momentary pushbutton switch 14 after the playing of the third note 34 of the PREVIEW SEQUENCE 17A, but before the playing of the next note 35, the "hit" 15A is scored. This is the highest possible score, since the player has correctly identified the appearance of the three-note PREVIEW SEQUENCE 17A before any other notes thereafter have been heard.

C. If the player actuates the momentary pushbutton switch 14 after the playing of note 35, which is one note past the notes in the PREVIEW SEQUENCE 17A, but before the playing of note 36 the "miss-by-1" is scored, since the melody 17 has played one note past the three-note PREVIEW SEQUENCE of notes 17A.

D. If the player actuates the momentary pushbutton switch 14 any time after the playing of note 36 or never presses the momentary pushbutton switch 14, the "miss" 16B is scored because the melody has proceeded two notes or more past the PREVIEW SEQUENCE 17A.

The actual notes selected for melody 17, and the relative position of the three preview notes 32-33-34 in melody 17 are determined by the microprocessor 11 and its associated firmware for every round on a random basis. Therefore, although in FIG. 2 the three preview notes 17A appear as the third, fourth and fifth notes of the thirty note melody 17, in the next round a different sequence of thirty notes are played, and the position of the three preview notes could be anywhere in the melody, for example the 25th, 26th and 27th notes. This variation of melodies and positions of the preview notes within the melody prevents a player from detecting patterns and anticipating the best times to actuate the momentary pushbutton switch 14.

Although a three note preview sequence and a thirty note melody are described it will be understood by those skilled in the art that other preview sequence lengths and melody line lengths are possible. For example, a four-note PREVIEW SEQUENCE and a forty note melody line.

The strategic value of switch 28 can now be appreciated. If a player elects to play a round using the lights by placing switch 28 to the "ON" position, the player has the benefit of responding not only to the sounds of the notes played through loudspeaker 13, but also the visual cue of a pattern of lights in the group of lights 12. In the example round of FIG. 2, if the player elects to play the round with lights, he or she may watch the lights and memorize the visual pattern of lights four-six-one in sequence. This makes recognition of the notes in the PREVIEW SEQUENCE 17A much easier, since two senses, sight and sound, are employed in combination to recognize the PREVIEW SEQUENCE 17A.

The scoring system is arranged so that for any given score, an additional bonus score is added if the round was played without benefit of watching the lights. This gives players an incentive to develop ear training, since bonus points are only awarded to players who can successfully play rounds by ear alone.

To increase the challenge of the game as the rounds progress, the tempo of the notes increases for every round. The tempo of the notes played during a preview sequence, such as the PREVIEW SEQUENCE 17A, is the same as the tempo of the notes played in the melody 17, so the player can hear the tempo for the upcoming round by noticing that the preview notes 17A are heard at a faster and faster rate as the rounds progress. In other words, the player "previews" the three-note pattern and the tempo of the melody for each upcoming round. Even the best players will probably need to start using the lights as the tempo reaches a very rapid pace. Deciding when to use the lights thus becomes a strategic and competitive decision for each player.

To heighten the tension as the rounds progress, the musical key of the melody notes 17 is raised by one note of the scale for every round. Accurate musical tuning is maintained in every key. The general increase in pitch and the quickened tempo of every round makes rounds more and more exciting and challenging as the game progresses.

Scoring

A round ends when the player actuates the momentary pushbutton switch 14, or if the momentary pushbutton switch 14 is never actuated, after the last note of the melody line 17 is played. The player's score is calculated and updated after every round. The score depends on three factors:

(A) the player's precision in actuating the momentary pushbutton switch 14 as previously described;
(B) whether or not the lights were used during the round as selected by switch 28, and
(C) the round number.

A typical scoring system is to award "H" points for a "hit" M points for a "miss-by-1" where $H > M$, and penalty points "P" for a miss where $M > P$. If the player scores either a hit or a miss-by-1, an additional point value B is added if the round was played without the lights. The numbers H, M, and B generally increase with round number, since the notes are played faster as the rounds advance and it is correspondingly more and more difficult to activate momentary pushbutton switch 14 at the proper time. After each round, the player is informed of the achieved round score by a sequence of short beeps where one beep is heard per point, or by a different sound (a "razz" sound) for a miss. The player's total score is then indicated using the lights 12 and loudspeaker 13 to issue one beep per point, while sequencing the lights 12, once per beep.

Typical values for round 1 would be $H=2$, $M=1$, $B=1$, and $P=-2$. Thus a player who plays round 1 with the lights scores 2 points for a hit, 1 point for a miss-by-1, and $-2$ points for a miss; while a player who plays round 1 without the lights scores 3 points for a hit, 2 points for a miss-by-1, and $-2$ points for a miss. The score is never allowed to go below 0. For an advanced round, such as round 12, score values might be $H=4$, $M=3$, and $B=2$. A schedule of score values by round is kept in a table in a computer program used to play the game as will be described hereinafter.

A game could end when a player scores a miss or after a certain number of Y misses. A preferred way to end the game is to allow the player unlimited misses up to a certain round, such as round eight, and then to end the game for any miss after round eight. This allows beginners to play eight rounds without ending the game. The indicator light 16 in FIG. 1 illuminates, and a distinctive sound is heard from loudspeaker 13, at the beginning of round eight to alert the player that any subsequent miss will end the game. Indicator light 16 also has other purposes in the multiple-player game, such as indicating which player has won the round, which will become clear when the multiple-player game is described hereinafter.

Hardware

Figure 3:
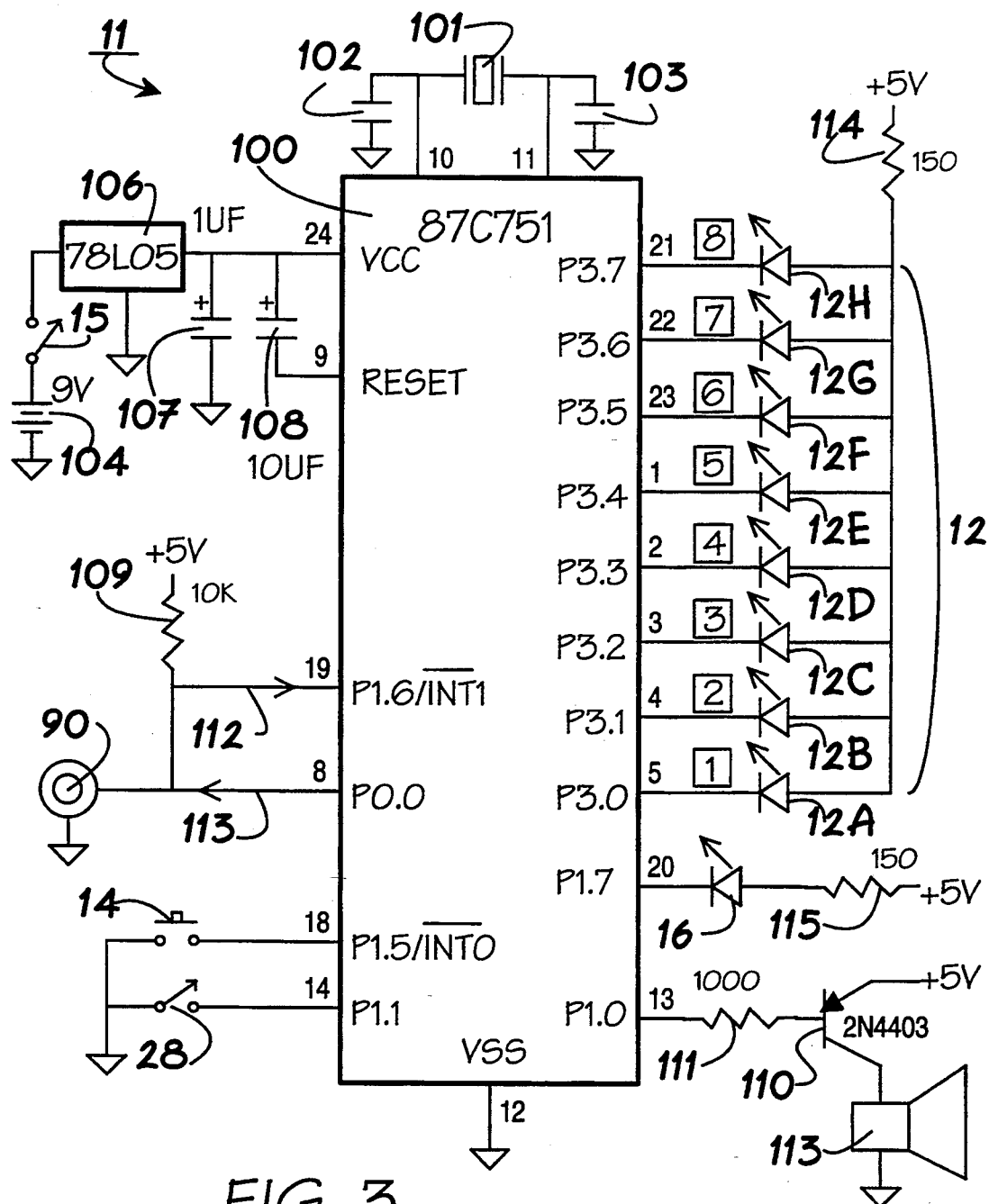
FIG. 3 is an electronic schematic of a microprocessor circuit used to implement the game of FIG. 1.

Turning now to FIG. 3, there is shown a schematic diagram of the device 10. The microprocessor 11, is controlled by a game computer program 100. Microprocessor 11 is a Philips/Signetics 87C751, a single chip processor with an Electrically Programmable ROM (EPROM), or an 83C751, which uses a masked ROM. This processor, which is a member of the Intel 8051 family, is described in the Philips data book IC20, entitled 80C51-*Based 8-Bit Microcontrollers,* dated February 1992. The general characteristics of the processor family and the instruction set are described in Section 1 (pp. 3–132), and the specific features of the 87C751 are described on pages 573–590.

A crystal 101 establishes a precise internal clock frequency for the microprocessor 11. The precision of this clock signal allows accurately tuned musical notes, and also allows precise timing relationships to be established in the signals that are sent between units. A pair of capacitors 102 and 103 provide the proper loading for crystal 101. The eight lights 12A–12H are connected to an output PORT3 of microprocessor 11, and they share a single current-limiting resistor 114 since only one light is energized at any given time. Whenever the internal program writes a logic "0" to one of the PORT3 output bits, the LED connected to that output pin is illuminated.

Loudspeaker 13 is powered by a transistor 110 through a current limiting resistor 111, which is connected to PORT1.0 of the microprocessor 11. When power is first applied to processor 11, all port bits are "HI" which causes transistor 110 to turn off, insuring that the loudspeaker 13 is off when power is first turned on.

Momentary pushbutton switch 14 is connected to pin 18 of the microprocessor 11, which functions as input PORT1.5 and also as an interrupt input/INT0. Switch 28 is connected to PORT1.1, which is used as an input port. Connector 90 is the bus interface connector, which implements a single wire, bi-directional bus by serving both as an input to, and an output from, the microprocessor 11. Signals from other devices or game units attached to connector 90 are sensed by microprocessor input port PORT1.6,(112), and microprocessor 11 drives the bus from it's output PORT0.0 (113) which is an "open-drain" output. This type of output consists of a switching transistor connected to ground potential (0 volts), so that it can connect the signal at connector 90 to a logic "LO" or leave it floating. A pullup resistor 109 insures that when the PORT0.0 output is not driving low, the bus is pulled up to a logic HI state due to the connection through the resistor 109 to the positive power supply.

The game is powered by a standard 9 volt battery 104, which is connected to one side of a power on/off switch 15. The other side of switch 15 is connected to a voltage regulator 106, which supplies the system with a regulated source of 5 volt power. A capacitor 107 is required by regulator 106 for stability. A capacitor 108 provides a reset signal to the processor 11 when power is first applied. A light emitting diode 16 is connected between an output PORT 1.7 and the 5 volt source via a 150 ohm resistor 115. The diode 16 is illuminated at the end of one round of play and during multiple player play to indicate the winning player.

Random Number Generator

The notes of the melody played during a round are selected on a random basis, so that the melodies are never predictable from round to round or from game to game. The random sequence of tones used to play the melody every round is generated by a computer algorithm that generates random numbers with special properties. An informative article by Martin Gardner in the April 1978 issue of *Scientific American* entitled "White and Brown Music, Fractal Curves and 1/f Fluctuations" (pp 16–31) which is incorporated herein by reference, discusses computer-generated music, and investigates various types of random number generators and their suitability for generating "random" music. To summarize the article, three types of random number generators can be used to produce random melodies: white noise, brownian noise, and 1/f noise. If a computer is programmed to generate sequences of random numbers of each of these three types, and notes of the scale are assigned to the random numbers so generated, then the resulting melodies will have distinctly different characteristics, some more interesting and pleasing than others.

Melodies generated with white noise tend to have no correlation, and sound like the dull kind of music that would result from a monkey hitting piano keys with one finger. Melodies generated using brownian noise (where the step sizes, although random, are small) has a "meandering" scale-like sound, also with little interest or aesthetic appeal.

Melodies generated with 1/f noise have the characteristic of a "fractal" curve, i.e. the sequence of notes is moderately correlated, not just over short runs but throughout runs of any size. (A common fractal example in graphic form is an aerial photograph of a coastline, where the detail of the coastline appears the same no matter what magnification is used to inspect it.) Because of the partial correlation that exists in runs of notes generated with 1/f random numbers, melodies generated with a 1/f noise algorithm are judged by most observers to be more pleasing than those generated with either white-noise or brown-noise random numbers.

Furthermore, the moderate correlation that exists in melodies generated with a 1/f noise algorithm makes the present invention very interesting and challenging, for the following reason. If a sequence of tones is generated with a 1/f-noise generator, and if a small portion of notes is removed from the sequence and played in isolation (the "preview" notes), then when the entire melody is played there will be many instances when three-note sequences are heard that are very close to, but do not exactly match, the preview notes. This makes the game very entertaining and challenging, and discourages the player's natural tendency to anticipate by pressing the stop button after hearing two of the three sought notes, just as the third one starts playing.

The computer algorithm described in pages 24–25 of the Gardiner article for generating "1/f" noise is implemented in the subroutine "OOF" ("One Over F"), commencing on line 1387 of the listing in Appendix A, which is a fully commented software program for the 87C751 processor circuit shown in FIG. 3. A random number generator routine "RANDOM" is called at various times by the "OOF" routine. The "RANDOM" routine begins on line 1345 of Appendix A. This algorithm is described on page 487 of *Musical Applications of Microprocessors,* by Hal Chamberlain, Hayden Books, 1988, which is incorporated herein by reference. The algorithm is enhanced slightly to add a check for a zero value of the 16-bit random polynomial randH:randL (the concatenation of 8-bit bytes randH and randL), since if the polynomial takes on a value of zero the result is an endless stream of O's.

Considering now the subroutine "OOF" in greater detail, the "one-over-f" random sequence generator is based on the algorithm mentioned in the Gardiner article. The algorithm is based on the analogy of considering four imaginary eight-sided dice, each capable of giving random values between 0 and 7. To generate a random number that has the properties of "1/f" noise, certain imaginary dice are tossed, and the spot totals for all four imaginary dice are added together to give the random value. The key to the algorithm is that not all the imaginary dice are tossed every time, but all of the imaginary dice, whether thrown or not, contribute to the sum. Thus some retain their values while others contribute randomly to the sum for any particular "toss," giving the partial correlation property.

Which of the imaginary dice are tossed each time is determined by tabulating the binary values of a four-bit counter, and looking for transitions, either 0-to-1 or 1-to-0, in the bits. Whenever a bit makes a transition, its corresponding "imaginary die" is tossed.

In the "OOF" subroutine, four 4-bit values D1, D2, D3 and D4 represent the four "imaginary dice." The variable "mask" implements a four-bit counter as illustrated in Table I.

TABLE I

| D4 | D3 | D2 | D1 | Toss Imaginary Dice |
|---|---|---|---|---|
| 0 | 0 | 0 | 0 | |
| 0 | 0 | 0 | 1 | D1 |
| 0 | 0 | 1 | 0 | D1,D2 |
| 0 | 0 | 1 | 1 | D1 |
| 0 | 1 | 0 | 0 | D1,D2,D3 |
| 0 | 1 | 0 | 1 | D1 |
| 0 | 1 | 1 | 0 | D1,D2 |
| 0 | 1 | 1 | 1 | D1 |
| 1 | 0 | 0 | 0 | D1,D2,D3,D4 |
| 1 | 0 | 0 | 1 | D1 |
| 1 | 0 | 1 | 0 | D1,D2 |
| 1 | 0 | 1 | 1 | D1 |
| 1 | 1 | 0 | 0 | D1,D2,D3 |
| 1 | 1 | 0 | 1 | D1 |
| 1 | 1 | 1 | 0 | D1,D2 |
| 1 | 1 | 1 | 1 | D1 |
| 0 | 0 | 0 | 0 | D1,D2,D3,D4 (etc.) |

At lines 1390–1392, the value of "mask" is incremented, exclusive-ORed with its previous value, and then saved in the variable "shift-mask," which contains a "1" in any bit position where there was a bit transition. Then the bits are examined one at a time to determine which of the dice need to be tossed.

Considering now the subroutine "RANDOM" in greater detail, the subroutine "RANDOM" commencing at line 1345, is called whenever a new random value is required for one of the dice D1–D4. 8-bit random values from the "RANDOM" subroutine are scaled to values 0–7 by zeroing all but the three least-significant bits. The four dice are then summed, and again scaled to the interval 0–7 by using only the three least-significant bits. When the four-bit count value of "mask" reaches 15 (1111), the next value it assumes is 0 (0000), i.e. the counter "wraps around" at a count of 15, and the count sequence begins again at 0. This is shown as the last entry in Table I.

In addition to the random generation of melodies, an added feature of the device 10 is that melodies may also be pre-stored, and substituted for the random melodies, but on a very unpredictable basis. For example, if a player is able to accumulate a score of 16 without any misses, there is a 50—50 chance in any subsequent round that a melody which consists of an edited version of J. S. Bach's *Suite no. 1 in G* minor for unaccompanied cello (BWV 1007) will be played in place of the random melody, but only once per game. This melody is stored in the table labelled, "Bach-melody" commencing at line 1551 of Appendix A, and the program logic which decides if and when to play the special pre-stored melody occupies lines 933–943 of Appendix A. If it is decided to substitute the special pre-stored melody in place of the randomly generated melody, the preview notes are selected from the pre-stored melody in a random position, exactly in the manner that preview notes are randomly selected in a random melody. The appearance of a pre-stored melody can have a very startling and amusing effect, especially to a musician playing the game who recognizes the pre-stored melody. Due to the unpredictable and fleeting appearance of the pre-stored melody, there will be much puzzlement regarding whether or not the game "randomly played Bach", and players may try in earnest to cause it to occur again.

Game Flowchart

Figure 4:
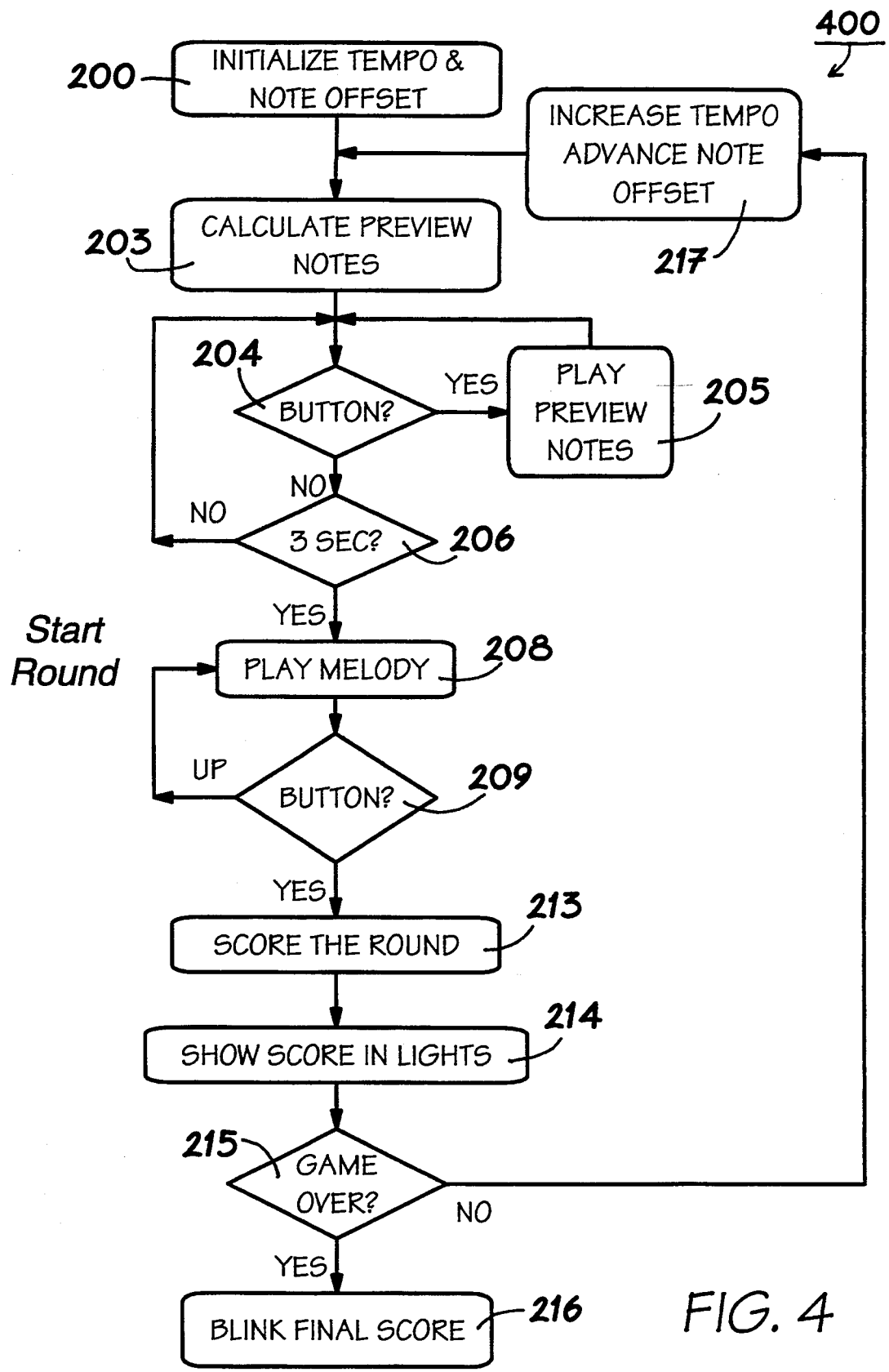
FIG. 4 is a flowchart illustrating the structure of a computer program that implements a game for a single player.

The game and all of the features therein are implemented by the computer program 100 in microprocessor 11. This program, shown as a fully commented listing in Appendix A, is organized in accordance with the flowchart of FIG. 4, which shows a "top level" flowchart 400 of the game operations.

At the beginning of the game, as indicated at 200, the slowest tempo value and lowest starting note of the scale are initialized.

The program then determines the preview notes, shown at 203. This is done by calculating a random number which is limited to possible beginning points in the melody for the three note preview notes.

The program then enters a waiting loop comprising flowchart elements 204 through 206. At 204, momentary pushbutton switch 14 (henceforth referred to as "the button") is sensed. If it is depressed, the preview notes are played, indicated at 205. The button is then checked again at 204. If the button is not depressed, a check is made to see if 3 seconds have elapsed since the button was last pushed, indicated at 206. If 3 seconds have not elapsed, the button is again checked at 204. In this manner the player may press the button as many times as desired to hear the preview notes.

Once three seconds have elapsed, the round begins at 208. The melody commences playing at 208. As the melody plays, the button is checked, indicated at 209. If the button is not pressed, the melody continues at 208. As soon as the button is pressed, the round is scored at 213.

The round is scored at 213, and the score is indicated to the player in the lights and loudspeaker at 214. At 215 the game unit determines whether the game is over, and if it is the final score is blinked in the lights at 216. If the game is not over, another round is initialized at 217, where the game tempo is increased and the "note offset", or beginning pitch of the notes of the scale to be used to play the melody, is increased. Another round then commences at 203 for the single player game.

Figure 5:
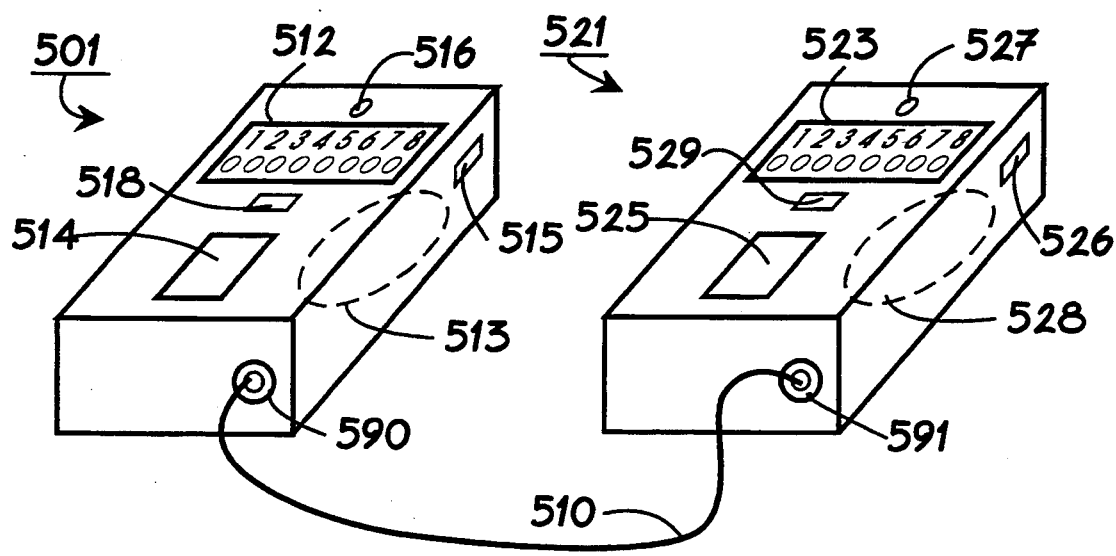
FIG. 5 is a diagrammatic view of two compact versions of the game interconnected by a cable to allow two players to play competitively.

Referring now to FIG. 5, there is shown an electronic game arrangement 500 which is constructed in accordance with the present invention. The game arrangement 500 generally includes a pair of similar game devices 501 and 521 respectively. Game devices 501 and 521 are substantially similar to game device 10 and are interconnected to one another by a cable 510 for enabling two players to engage in simultaneous competition.

Considering now the game arrangement 500 in greater detail with reference to FIG. 5, novel feature of the arrangement 500 is that multiple games may be connected together so that multiple players may compete against each other. Referring to FIG. 5, this is accomplished by connecting the cable 510 from connector 590 of device 501 to connector 591 of the second similar device 521. Although for clarity a two player game is shown and described, it will become clear that the techniques used to expand the game from one to two players may be easily extended to more than two players.

After the two devices 501 and 521 have been connected via the cable 510, they are turned on using their respective power switches 515 and 526. In response to the devices 501 and 521 being energized, the indicator light 516 and 527 illuminates on each respective device 501 and 521 to indicate that a connection has been achieved. The game now plays in an almost identical manner as the single device, such as the device 10 alone, but with interesting differences to account for the competitive play.

Each player begins a round by determining whether he or she desires to play with or without lights 512 and 523 on devices 501 and 521 respectively by actuating respective switches 518 and 529. Each player then actuates his or her respective pushbuttons 514 and 525, to hear the preview notes, as in the single player game. Due to communication between the two devices 501 and 521 which will be subsequently described, each device plays the same three note PREVIEW SEQUENCE. As in the single-player game, the players may actuate their respective switches 514 and 525 as many times as desired to repeat the PREVIEW SEQUENCE, and manipulate the respective "LIGHTS" switches 518 and 529 freely during the PREVIEW SEQUENCE. When neither player actuates his or her respective pushbuttons 514 and 525 for at least 3 seconds, a round commences.

Both devices 501 and 521 now play exactly the same melody, with notes playing at exactly the same times (in unison) in each respective devices speaker 513 and 528. This synchronization is achieved via the cable 510 connecting the two devices 501 and 521. Each player is free to actuate the respective switch 514 and 525 on his or her device to terminate the round, as in the single player game. When the player actuates his or her momentary switch, the melody stops playing, and the lights (if enabled) turn off, but the round does not end until all players have actuated their associated momentary switches, or the melody has played out. The end of a round for a multiple-player game is thus, when all players have ended their individual rounds.

Score data is then passed between the devices 501 and 521 via the connecting cable 510, and the scoring is performed. The scoring system is similar to a single player game, but is enhanced to account for the competition between the multiple-players. To win "hit" points, a player must not only satisfy the requirements of a "hit" for the single player game, but that player must also have actuated his or her toggle switch at a more advantageous time than the other player or players.

Suppose that there are two players, A and B. Referring to FIG. 2, if player A actuates his or her switch during interval 15A, scoring a "hit", and player B actuates his or her switch during interval 15B, scoring a "miss-by-1", player A wins the round. Likewise, a miss-by-1 15B beats a miss 16A or miss 16B. In other words, a better score always beats a worse score.

There may be instances when both players actuate their pushbuttons 514 and 525 (FIG. 5), in the same time intervals. For example, suppose both player A and player B actuate their pushbutton 514, 525 during interval 15A (FIG. 2). This causes a second criterion to be used to determine the winner. The time that has elapsed between the onset of note 34, which is the third note of the PREVIEW SEQUENCE, and the time that the pushbutton was actuated is recorded for both players. The player with the lowest time so measured then wins the round. In other words, the fastest winning push wins. It is possible for players to hit their pushbuttons at precisely the same time, and thus to "tie", in which case all tied players are awarded the winning points.

After every round, the winner is determined, and light 516 or 527 (FIG. 5) illuminates only on the device of the winner. The game then proceeds to the next PREVIEW SEQUENCE, as in the single-player game. The game ends when both players miss after round eight.

It should be emphasized that the two player utilization of the game arrangement 500 is accomplished by merely connecting cable 510 between identical single player devices such as between devices 501 and 521, and no special switches, cartridges or other selection means are needed to activate the multiple-player game. The game software as will be explained hereinafter enables multiple-player games to be played, using substantially the same computer code as for a single player game but with a few modifications.

N-Players

Figure 6:
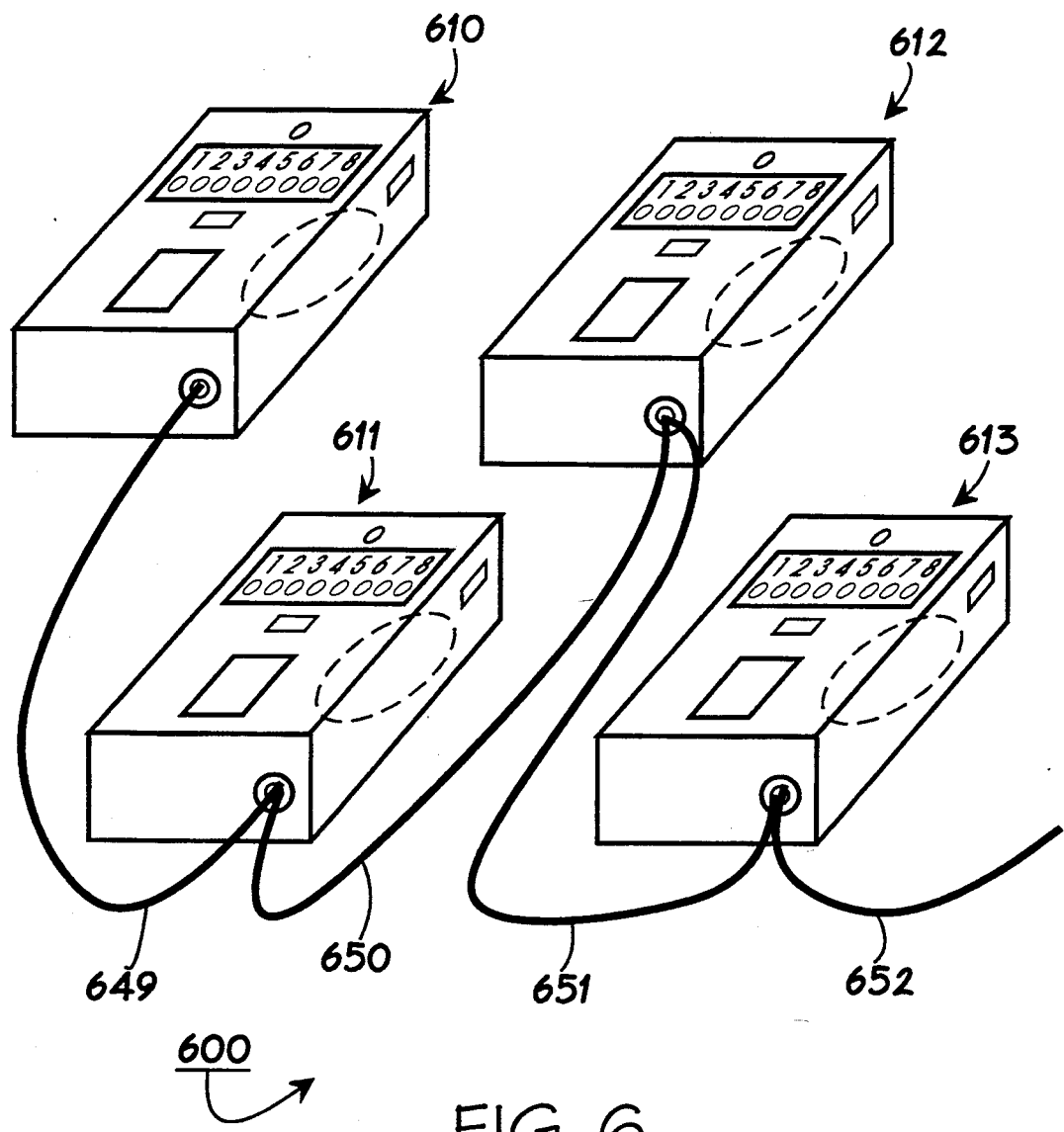
FIG. 6 is a diagrammatic view of four identical game units connected by a cable to allow multiple players to play competitively.

Game play is not limited to one or two players, but may be played simultaneously by N players where N is greater than two. In this regard, as best seen in FIG. 6, four like game units 610–613 are interconnected together by a set of Y conductors 649–651 respectively. As games 610–613 are each substantially similar to game 10, they will not be described in greater detail.

Certain augmentations to the game electronics and software permit multiple standard game units to be coupled together and used to play simultaneous games in a competitive manner, as follows:

1. A means is provided to allow the game units to communicate data back and forth, such as the round initialization data and end-of-round score data.
2. A means is provided to synchronize the game units so that the melody notes are played at exactly the same time in all units.
3. A signalling method is provided to allow game units to detect when all the other connected units have finished with the PREVIEW SEQUENCE and rounds.
4. The scoring system is expanded to handle multiple players.

For the purpose of exchanging data between connected units, a master-slave relationship is first established among the connected units. There is only one master unit, and there can be multiple slave units. The master unit:

Provides initialization data to all slave units to insure that identical rounds are played on all units;

Provides a tempo timer to all slave units, so that the identical melody notes heard from all units are played in unison;

Receives preliminary score data from the slave units at the end of every round, arbitrates the round score data as to winners and losers, and sends final round score data back to the slave units so that they may indicate their individual scores.

The master unit enjoys no strategic advantage in the game. For example, if two identical game units 501 and 521 are connected via cable 510 (FIG. 5), and turned on one hundred times, device 501 will become the master approximately half of the times and device 521 will become the master the other half of the times, with no indication whatsoever of a master-slave arrangement evident to the player. In other words, the master-slave arrangement is merely a "bookkeeping" arrangement, which has no impact on the play of the game.

Communication takes place over a two conductor cable 510 (FIG. 5), where one wire of the cable is a common ground, and the other wire is connected as a "wired-OR" bidirectional bus. In a wired-OR arrangement, the bus signal line is pulled up to the positive power supply through a resistor in every game unit. As previously described, every game unit has the capability to read the state of the bus, and also to pull the bus LO (said to "assert" the bus) through an electronic switch to ground. Any game unit that asserts its own driver pulls the bus low. Only when all game units do not assert their individual bus drivers (said to "release" the bus) does the bus return to its non-driven HI state.

The wired-OR property is used to establish which of the game units is to be the master and which are to be slaves. Before a game starts, at a certain time, one of the game units asserts its bus driver, pulling the bus line low, and it holds it low for a random time interval between .5T and T. Any game units that are not at that instant trying to become the master by pulling their own bus driver low recognize this hi-to-lo transition and immediately assume the slave mode. They indicate this by asserting their own bus drivers for a time interval equal to T, commencing time T after the LO pulse began. The unit that has asserted its bus then de-asserts its driver by time T, and then it checks the state of the bus at time $(1.5) \times (T)$. If it finds a LO, it knows that other units have become slaves and its "master" status is established.

When the unit that is attempting to become the master by asserting the bus LO (unit A) de-asserts the bus, it immediately checks the bus state. If it finds the bus still LO, it is discovered that another unit (unit B) has pulled the bus LO in an attempt to become the master at exactly the same time that unit A did. However the fact that the bus is still low after unit A releases the bus causes unit A to immediately assume slave status. In this way conflicts between potential masters are resolved.

If the unit which has asserted its bus detects that the bus is HI at time $(1.5) \times (T)$, then no units have responded as slaves and the process of establishing a master-slave connection continues. If at any time during this arbitration process the player presses the pushbutton, a one-player game is initiated and the master-slave search and arbitration is abandoned.

To insure that two game units which make simultaneous attempts to become a master do not continue to make simultaneous attempts, each game unit waits a random time interval before attempting again to become the master by asserting the bus. Ultimately, there will always be a time when only one unit tries to become the master and the arbitration is successful.

Once a master-slave relationship is determined, a single master is established, but it is not yet certain how many slaves are connected. A check is therefore made for the existence of more than one slave. This is done by initiating a secondary arbitration sequence, whereby the master sends out address data on the bus, and looks for an acknowledgement by one or more slave units. Data is passed between units as 8-bit bytes, using "software UART" (Universal Asynchronous Receiver-Transmitter) subroutines in each game unit. Serial 8-bit data is received using the "Rx" routine commencing at line 1015, and transmitted using the "Tx" routine commencing at line 1053, of Appendix A. The techniques for implementing a software UART are well known and documented in many sources, for example pages 716–721 of the aforementioned Philips-Signetics Data Book.

The Tx and Rx routines are augmented to add an "acknowledge" pulse whenever a unit receives data from another unit. Transmission begins with a "start bit", which is a LO value on the bus, followed by eight data bits. Finally, a HI "stop bit" is sent. The receiver asserts the bus for a brief time after the stop bit, indicating to the sender that the byte was received.

Suppose that the master has just sent the address "001" using its Tx subroutine. All slaves simultaneously receive this value, having summoned their respective "Rx" subroutines. For the master-slave arbitration process only, a special acknowledge sequence is used, whereby each slave waits a random time interval before asserting its acknowledge pulse. Any slave A whose random time has elapsed, and therefore is ready to assert the bus to a LO state to begin its own acknowledge pulse, first checks the bus state, and if it finds it already LO, concludes that another slave unit B has already responded and it, unit A, therefore should not assume slave address 001. If slave A finds the bus HI, and has then held its acknowledge pulse LO for a time interval required for the master unit to read it, it then de-asserts its bus driver, again after a random time interval. Just after releasing the bus, it checks the bus state, and if it finds it LO, it is determined that another slave unit is also responding with an acknowledge pulse, and it relinquishes address 001 to the other slave unit. In other words, the first slave to assert the ACK wins the arbitration and assumes the transmitted slave address, and if there is a simultaneous bus assertion, the last slave to release the bus wins the arbitration.

The master then transmits slave address "002", and again checks for an acknowledge pulse. This process continues until no acknowledge is received, indicating that all connected slaves have been accounted for.

In this manner all slave game units establish a unique "address" with which the master unit can individually communicate with each slave unit over the single-wire bus using the serial transmit and receive routines. The master communicates with any individual slave by first sending a transfer request byte which contains the desired slave address, and only the requested slave unit responds on the bidirectional bus.

Figure 8:
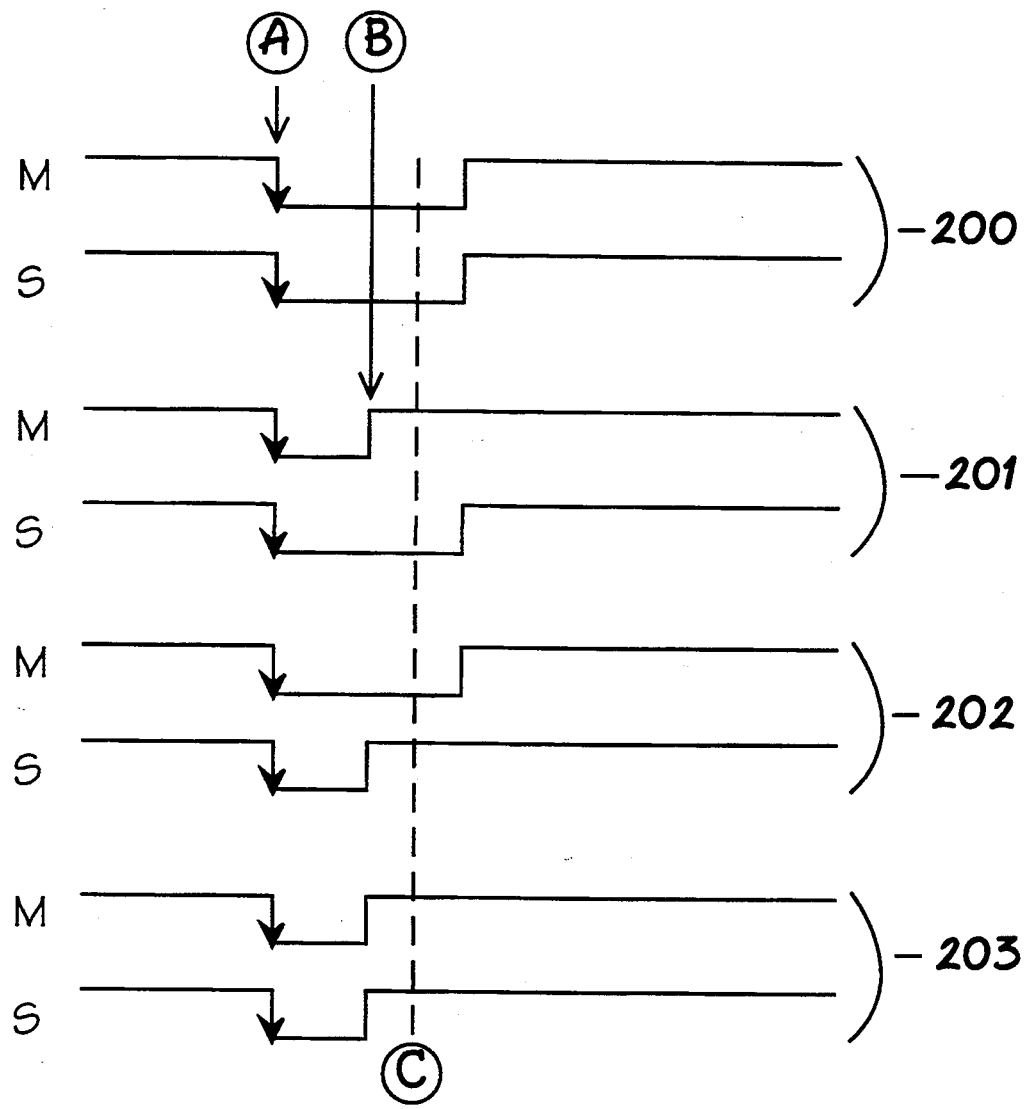
FIG. 8 is a timing diagram which illustrates how a single master game unit synchronizes multiply-connected slave units, and detects when all connected units have finished a round of play.

The method whereby all game units play melody notes in unison may be understood by referring to FIG. 8, where there are shown various waveforms that occur during a round on the wired-OR bus interconnecting the game units. The master issues a pulse at time A which is used by the slave units as a "metronome", that is a signal to play the next note or rest of the melody in sequence. The falling edge of the pulse beginning at A, indicated by an arrow, is used to establish the metronome "tick", and the ensuing width of the pulse is then used to convey when all game units have completed their respective rounds, as follows. The "metronome" pulse issued by the master at A can assume two different widths, either duration T or 2T as indicated in the waveforms 202. The 2T wide pulse is used when the game unit is playing a round, and the T-wide pulse is used when the game unit has finished its round (the player has pressed the pushbutton). Likewise, all slave units respond to the pulse at A by asserting their bus driver with a pulse of width 2T during their rounds, and of width T when their respective rounds are over. Thus only when the bus is LOW at time C are all game units finished with their respective rounds.

In waveforms 200, both the master and slave units are in the process of playing a round. In waveforms 201, the master has finished the round but the slave has not. In this case the master must continue to issue metronome pulses even though its own round is finished, so that the remaining slaves that are still playing their rounds will continue to play the melody notes in unison. In waveforms 202, the slave has finished but the master has not. In waveforms 203, both master and slave(s) units have finished, which is detected in all game units by the HI state of the bus at time C. Because of the "wired-OR" nature of the bus, it is HI at time C only after all units, master and all slaves, have completed their rounds.

Extension of the scoring system for multiple-players is straightforward. After every round, the master requests score information from each slave, addressing them in turn. From this score information the master makes the determination as to which of the players pressed the button at the most advantageous time, and in the case of ties, the reaction time is used to resolve the tie as in the two player game. The individual score information is then sent to each slave, each responding to its own unique address, and the individual units compute and display their scores. Thus the multiple-player scoring system is a simple extension of the two player scoring system, as previously described.

Multi-player Game Flowchart

The game arrangement 500 and all of the features therein are implemented by a computer program which is shown as a fully commented listing in Appendix B, and is organized in accordance with a flowchart 700 which shows "top level" game operations. The flow chart 700 includes each of the steps described relative to flowchart 400. Therefore, the description of these steps will not be repeated.

Figure 7:
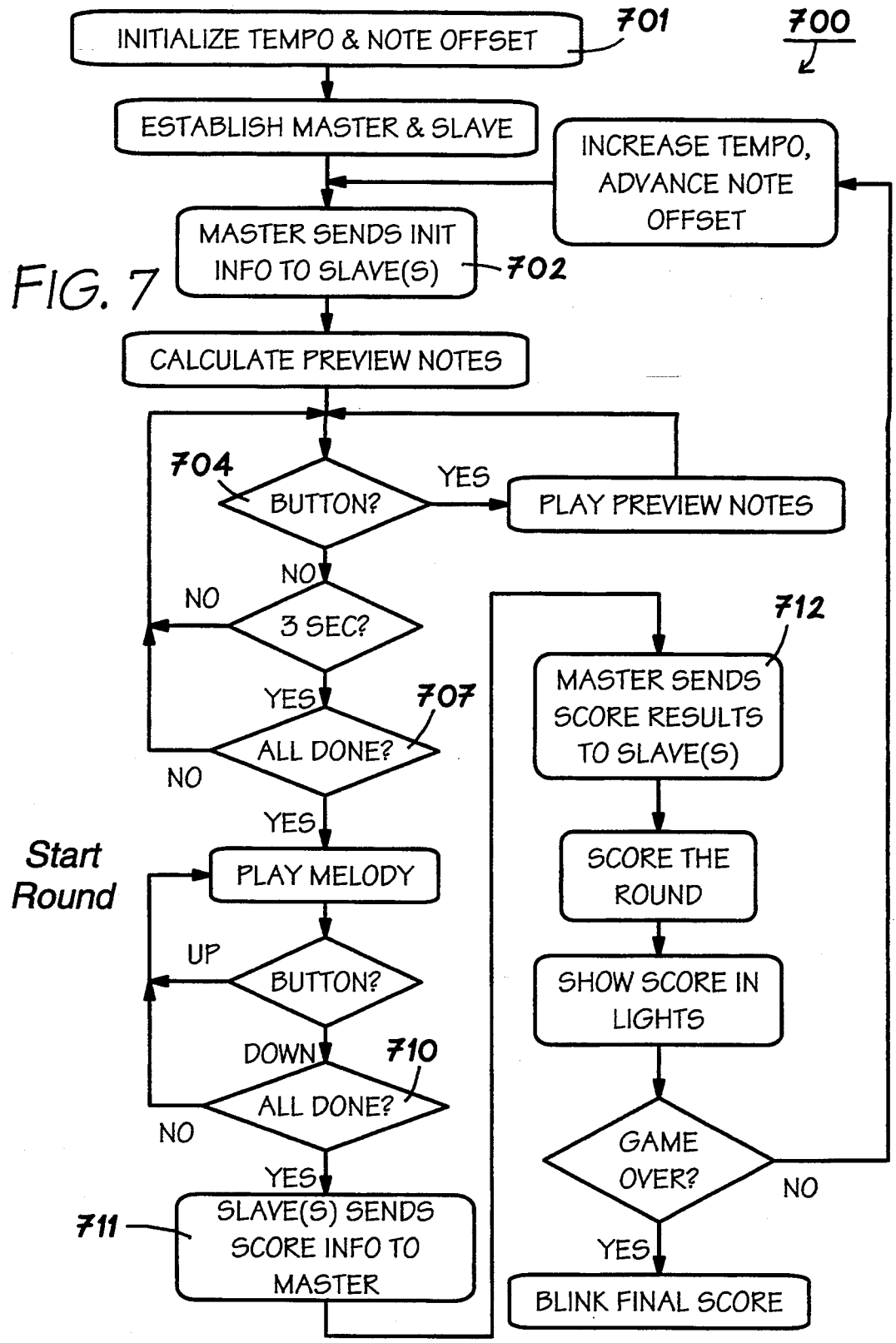
FIG. 7 is a flowchart illustrating the structure of a computer program that implements a multiple player game according to the invention.

Referring now to FIG. 7, at 701, if more than one unit is connected, a master-slave relationship is established, which allows one game unit to act as timekeeper and scorekeeper for the other connected game units. If a multiple-player game is in progress, the master game sends initialization information to the slave unit or units, indicated at 702. This initialization information insures that all connected games play the same preview notes and melody notes, such as the preview notes 17A and the melody notes 17 (FIG. 2) during every round.

Once the three seconds have elapsed, a decision instruction 707 is executed if a multiple-player game is being played, to insure that all connected games have finished their PREVIEW SEQUENCE. If all units have not finished previewing, in other words they have not all waited 3 seconds after pressing their respective pushbutton, the loop is continued at 704.

The melody is then played simultaneously on each unit, such as units 501 and 521 (FIG. 5). As the melody plays, each button is checked at 710 to determine if all buttons have been actuated. If all buttons have been actuated or the melody has completed its sequence, the program advances to instruction box 711 where the slave unit or units send score information to the master unit. This information consists of hit/miss information, and timing information indicative of how fast the player pressed the button. The master unit then arbitrates the individual scores, determines winners and losers for the round, and then transmits the score results to the slave unit or units at 712.

Figure 9:
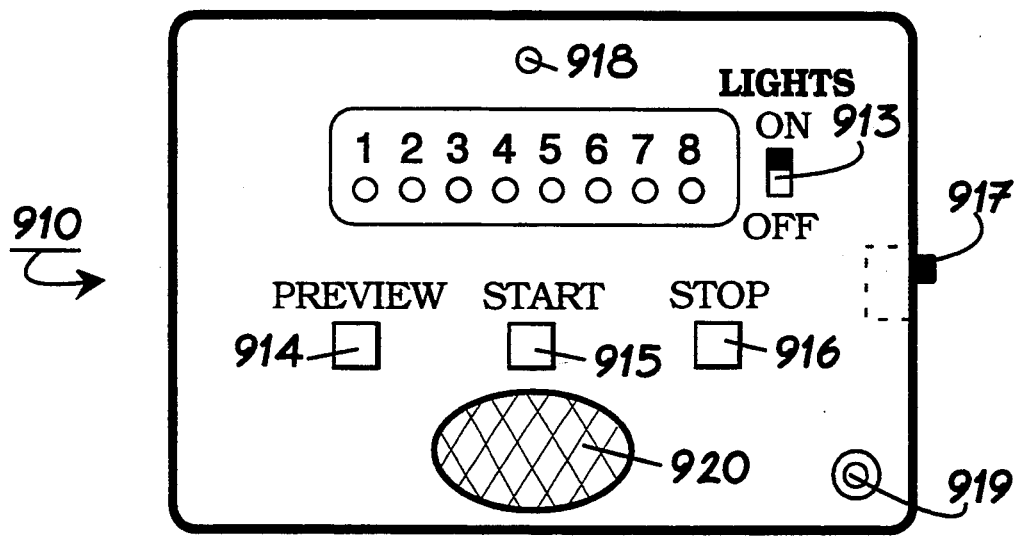
FIG. 9 is a diagrammatic view of another embodiment of a musical electronic game which is constructed in accordance with the present invention.

Referring now to FIG. 9, there is shown an electronic game device 910 which is constructed in accordance with the present invention. The game device 910 is similar to game device 10 except the single multi-function game momentary pushbutton switch 14 is replaced by three individual pushbutton switches, for example a PREVIEW switch 914, a START switch 915, and a STOP switch 916 as best seen in FIG. 9. In this regard, FIG. 9 illustrates an electronic game device 900 which is similar to device 10 but includes switches 114, 115 and 116 in lieu of a single momentary pushbutton switch 14. Game is played in a similar manner except at the beginning of every round, switch 914 is actuated to preview the three notes, in the same manner as initiated by the momentary pushbutton switch 14 in FIG. 1. A round is initiated, when the START button 915 is actuated. Once the round starts, actuating the STOP button 916 terminates the round for scoring purposes. A power ON/OFF switch 917 enables power to be applied to the unit 910. A light emitting diode 918 serves the same purpose as LED 16 (FIG. 1). A set 912 of lights is controlled by a light switch 913. Sounds are heard via a speaker 920. A connector 919 allows similar game units to be connected together via a cable (not shown) for simultaneous multiplayer games.

Wireless

Figure 10:
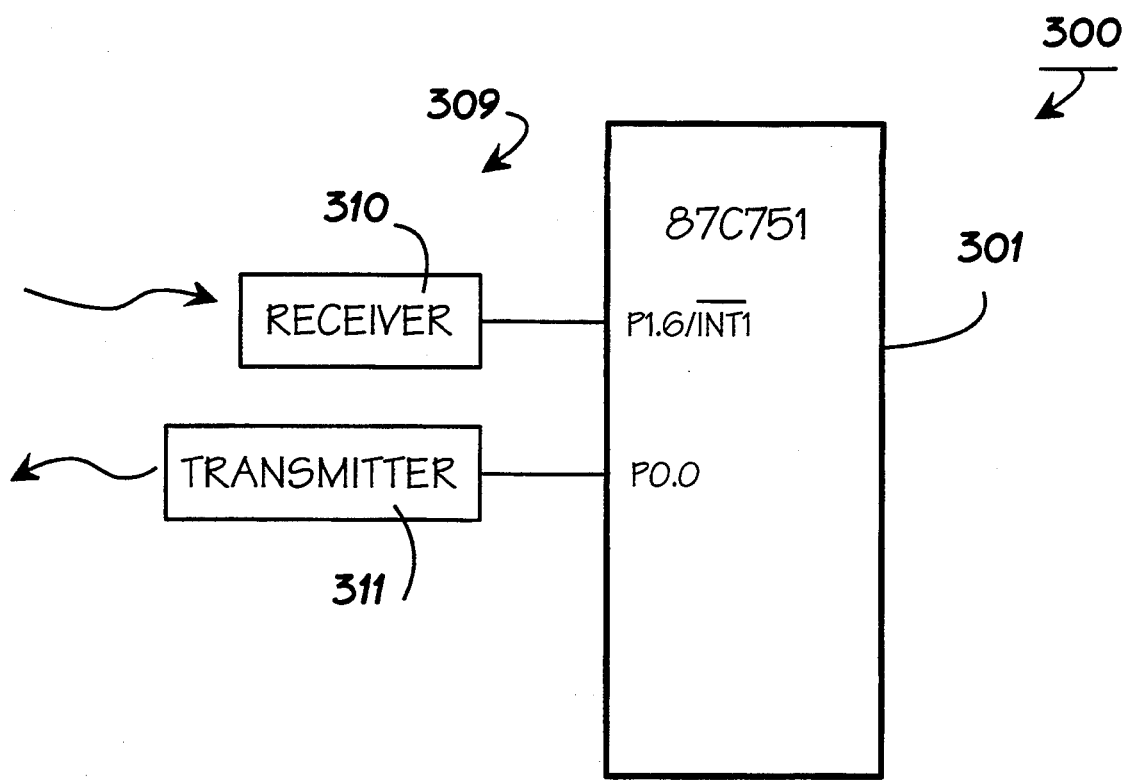
FIG. 10 is a symbolic block diagram of a wireless musical electronic game which is constructed in accordance with the present invention.

Referring now to FIG. 10, another electronic game device 300 is shown which is constructed in accordance with the present invention. The device 300 is similar to device 10 except that connector 90 is replaced by a communication arrangement 309 having a receiver, such as an infrared or radio frequency receiver 310 and transmitter 311 for communication purposes with a similar unit.

As best seen in FIG. 10, the receiver 310 is connected to a communication input PORT P1.6/$\overline{\text{INT1}}$ of a microprocessor 301. Microprocessor 301 is similar to microprocessor 11. The transmitter 311 is connected to a communication output port P$\phi$.0 of the microprocessor 301.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

```
$paginate pagewidth=120 pagelength=71 date
;————————
; Maestro 1992-4.9152  ver 0.4
;————————
; Reserved registers:
;       R7—tempo counter (incremented in Timerl interrupt routine).
;       R6—round note counter, decrements to 0
;————————
; Variable declarations
;————————
maxnotes         equ    36         ; play this many every round
score_tempo      equ    $10        ; for the beep-beep-beep scoring
start_tempo      equ    $48        ; game tempo starts here
speedup_factor   equ    $04        ; subtract this from game tempo every round
bigdel           equ    10         ; long delay (half seconds)
meddel           equ    3          ; medium delay (half seconds)
halfsec          equ    146        ; timerl .5 sec tempo value
;
spkr_bit         equ    p1.0
timer_on         equ    08Ch       ; TCON.4
CLRTI            equ    $DD
TR               equ    $8C
TIRUN            equ    $DC
ETI              equ    $AB
RTL              equ    $8B
RTH              equ    $8D
TL               equ    $8A
TH               equ    $8C
;
; Unique to '751
;
IE0              teq    $8B
IT0              teq    $8A
IE1              teq    $89
IT1              teq    $88
;
;————
; RAM equates
;————
seedH            equ    20H
seedL            equ    seedH+1
randH            equ    seedL+1
randL            equ    randH+1
mask             equ    randL+1
flags            equ    mask+1
flags2           equ    flags+1
d1               equ    flags2+1
d2               equ    d1+1
d3               equ    d2+1
d4               equ    d3+1
note_value       equ    d4+1
target_note_num  equ    note_value+1
s4               equ    target_note_num+1
s3               equ    s4+1
s2               equ    s3+1
s1               equ    s2+1
n3               equ    s1+1
n2               equ    n3+1
n1               equ    n2+1
```

```
60   game_tempo          equ    n1+1
61   tempo               equ    game_tempo+1
62   score_val           equ    tempo+1
63   score               equ    score_val+1
64   note_ctr            equ    score+1
65   round               equ    note_ctr+1
66   blink_val           equ    round+1
67   ;————
68   ; Bit equates
69   ;————
70   beat                equ    flags.0
71   pbut                equ    flags.1
72   with_lites          equ    flags.2
73   bach_round          equ    flags.3
74   bach_ff             equ    flags.4 ; play bach only once per round
75   razz_flag           equ    flags.5 ; indicates any miss in a round
76   ;
77   switch              equ    p1.1    ; lites on/off switch
78   the_button          equ    p1.5    ; momentary pushbutton
79   lite_port           equ    p3
80   ;
81
82           defseg  maes,absolute
83           seg     maes
84           org     0
85   ;————————
86   ; Interrupt Vectors
87   ;————————
88           jmp     start   ; reset
89
90           org     003h    ; INT0
91           setb    pbut    ; set the PB interrupt flag
92           clr     EX0     ; disable the int0 interrupt (PB)
93           reti
94
95           org     00Bh    ; Timer 0
96           cpl     spkr_bit
97           reti
98
99           org     013h    ; INT1
100          reti
101  ;
102          org     01Bh    ; Timer I
103  ;————————
104  ; Timer I used for tempo counter
105  ; NOTE: no I2C interrupt used at vector
106  ; loc. 023H, so TI code can go here.
107  ;————————
108          setb    CLRTI   ; clear interrupt
109          djnz    r7,tl_ex
110          mov     r7,tempo
111          setb    beat
112  tl_ex:  reti
113
114  ;————
115  ; Begin Code
116  ;————
117  ;
118          db      "Maestro 0.4, 12-02-92 LTH"
```

```
119  $ej
120  ;————
121  ; Start of Program
122  ;————
123  start:  mov    seedL,#55h
124          mov    seedH,#0AAh
125          mov    tcon,#00000001b ; int0:level(sw), int1:edge
126  new_game:
127          clr    bach_ff         ; play bach only once per game
128          clr    razz_flag       ; no misses yet...
129          mov    randL,seedL     ; insure nonzero RNG
130          mov    game_tempo,#start_tempo ; slowest tempo
131          mov    score,#0
132          mov    round,#0
133  ;
134  ; Wait for button down. NOTE: don't wait for button up
135  ; first since player might have just finished a game and
136  ; pressed the button, which should initiate the preview
137  ; sequence.
138  ;
139  wbdn:   acall  random          ; cycle the RNG
140          jb     the_button,wbdn
141          mov    r3,#0
142  wb2:    djnz   r3,wb2          ; debounce
143  ;
144  ; find the 3 note pattern
145  ;
146  new_round:
147          clr    bach_round              ; so far not a special round
148          jb     razz_flag,normal_round  ; no bach if any misses so far
149          jb     bach_ff,normal_round    ; already played a bach round
150          mov    a,score
151          cjne   a,#16,$+3
152          jc     normal_round            ; score lower than 16
153          acall  random
154          anl    a,#$10                  ; test a middle bit
155          jz     normal_round            ; 50-50 chance
156  ;————
157  ; Play the special Bach round
158  ;————
159  bk1:    setb   bach_ff         ; indicate "did it once already"
160          acall  random
161          anl    a,#$7F          ; 0-127
162          cjne   a,#29,$+3       ; (start w. 128 to cycle RNG some times)
163          jnc    bk1             ; less than 29: go again
164          mov    target_note_num,a
165          setb   bach_round      ; set the flag for other routines
166  ;
167  ; Get the three preview notes
168  ;
169          mov    r3,a            ; temp
170          mov    dptr,#bach_melody
171          movc   a,@a+dptr
172          mov    n1,a
173          inc    r3              ; next note
174          mov    a,r3
175          movc   a,@a+dptr
176          mov    n2,a
```

```
177              inc    r3
178              mov    a,r3
179              movc   a,@a+dptr
180              mov    n3,a
181      ;
182              mov    r6,#32           ; maxnotes for this round only
183              jmp    enable_ints      ; continue
184      ;
185      normal_round:
186              acall  random
187              anl    a,#1Fh           ; 0-31
188              inc    a                ; 1-32
189              mov    target_note_num,a
190              cjne   a,#29,$+3
191              jnc    new_round        ; a >= 29
192              mov    seedH,randH      ; initialize seeds for this round
193              mov    seedL,randL
194
195              acall  reset_RNG
196              mov    r3,target_note_num
197      adv:    acall  oof
198              djnz   r3,adv
199              mov    n1,a             ; stash first note
200              acall  oof
201              mov    n2,a             ; second
202              acall  oof
203              mov    n3,a             ; third
204              mov    r6,#maxnotes
205      :
206      enable_ints:
207              mov    a,#0FFh          ; initialize stream values
208              mov    s1,a             ; so match can't happen
209              mov    s2,a
210              mov    s3,a
211              mov    s4,a
212      :
213              clr    pbut             ; clear pushbutton flag
214              clr    TR               ; reset timer0 (pitch)
215              setb   ET0              ; enable timer0 interrupt
216              clr    T1run            ; reset timer 1 (tempo)
217              setb   ET1              ; enable timer 1 interrupt IE.3
218              clr    EX0              ; disable int0 (pushbutton) interrupt
219              setb   EA               ; interrupts ON
220      ————————
221      ; Play the preview sequence
222      ; ————————
223      preview:
224              mov    c,switch         ; copy switch flag -> with_lites flag
225              mov    with_lites,c     ; (remembers state thru preview sequence)
226      pv2:    mov    tempo,game_tempo
227              acall  enable_tempo_timer
228              mov    note_value,n1
229              acall  play_a_note
230              mov    note_value,n2
231              acall  play_a_note
232              mov    note_value,n3
233              acall  play_a_note
234      ;
235      ; If button down, wait for it to be released
```

```
236  ;
237  wu1:    jnb     the_button,wu1  ; jump when button is DN
238          mov     r3,#0
239  wu2:    djnz    r3,wu2          ; debounce
240  ;
241  ; If button pushed within about 3 seconds, preview again.
242  ; If not, start the round.
243  ;
244          mov     tempo,#halfsec  ; .5 sec ticks
245          mov     r3,#6           ; 3 seconds
246          acall   enable_tempo_timer
247  wdn:    mov     pcon,#1         ; zzzzzzzzzzzzzzz
248          jnb     the_button,preview  ; jump if PB down
249          acall   random
250          jnb     beat,wdn
251          clr     beat
252          djnz    r3,wdn
253  ;————
254  ; Start the round
255  ;————
256          acall   reset_RNG       ; reset RNG
257          mov     tempo,game_tempo
258          mov     note_ctr,#0
259          setb    EX0             ; enable PB interrupt IRQ0
260  ;
261          mov     c,switch
262          mov     with_lites,c    ; switch flag -> with_lites flag
263  ;
264  looper: jnb     bach_round,usual
265          mov     dptr,#bach_melody ; get the next note from table
266          mov     a,note_ctr
267          movc    a,@a+dptr
268          mov     note_value,a
269          jmp     us2
270  ;
271  usual:  acall   oof
272  us2:    acall   play_a_note
273          acall   update_stream
274          inc     note_ctr
275  ;
276  ; Check the pushbutton flag
277  ;
278          jb      pbut,round_over
279          djnz    r6,looper       ; not over yet
280  ;
281  ; Notes ran out
282  ;
283          mov     score_val,#-2   ; minus 2!
284          jmp     make_razz       ; skip over score_round to prevent
285  ;                               ; false score if notes appeared as last 3
286  round_over:
287          clr     EX1
288          setb    ETI
289          acall   score_round     ; add round score to SCORE
290          mov     a,score_val
291          cjne    a,#-2,tally_score
292  make_razz:
293          setb    razz_flag       ; no bach from now on this round
294          mov     r5,#bigdel      ; wait longest time
```

```
295             acall   delay
296             acall   razz
297     ;
298     tally_score:
299     ;
300     ; If past the 8th round and score_val=-2,
301     ; don't update the score--no miss penalty after
302     ; round 8
303     ;
304             mov     a,round
305             cjne    a,#8,$+3        ; fancy "CMP" instruction
306             jc      ts2             ; round not > 8 (round starts w. 0)
307             mov     a,score_val
308             cjne    a,#-2,ts2       ; not a miss
309             mov     a,score
310             jmp     ts3             ; bypass updating score
311
312     ts2:    mov     a,score         ; update the score for this round
313             add     a,score_val
314     ;
315     ; Minimum score is 1: if 0 or neg then set to 1
316     ;
317     ts3:    jnz     TS1             ; score not zero
318             inc     a               ; score is zero: make 1 (min score)
319     TS1:    jnb     ACC.7,plus_score ; score is positive
320             mov     a,#1            ; score is negative: make 1 (min) score
321     plus_score:
322             mov     score,a         ; score always + or 0
323             mov     a,score_val
324             cjne    a,#0,test2
325             jmp     show_score      ; it's 0: don't zip
326     test2:  cjne    a,#-2,make_zips
327             jmp     show_score      ; it's -2: don't zip
328     make_zips:                      ; it's positive: zip sound
329             mov     r5,#meddel      ; 3 half-seconds
330             acall   delay
331             mov     r3,score_val
332     zz:     acall   zip
333             djnz    r3,zz
334     show_score:
335             mov     a,score
336             cjne    a,#0,beep_out_score
337             jmp     getrdy
338     beep_out_score:
339             acall   beep_score
340     ;--------------------
341     ; Get ready for the next round
342     ; First check to see of a miss was
343     ; suffered in round 8 up--this ends
344     ; the game...
345     ;--------------------
346     getrdy: inc     round
347             mov     a,round
348             clr     c
349             subb    a,#8
350             jc      gr2             ; round no. is less than 8
351             mov     a,score_val     ; was it a miss?
352             cjne    a,#-2,gr2       ; not a miss--keep going
```

```
353          jmp      game_over       ; all done
354     ;
355     gr2: mov      a,game_tempo
356          clr      c
357          subb     a,#speedup_factor ; faster...
358          mov      game_tempo,a
359          mov      tempo,a
360
361     wt_up: jnb    the_button,wt_up ; if button down, wait for up
362          mov      r3,#0
363     wu3: djnz     r3,wu3          ; debounce
364     wt_dn5 setb   EX0             ; enable Pushbutton interrupt
365          clr      TIrun           ; turn off tempo timer Timerl
366          mov      pcon,#1         ; zzzzzzzzzzzzz
367          jmp      new_round
368     ;
369     game_over:
370          mov      tempo,#halfsec/4
371          acall    enable_tempo_timer
372          mov      r3,#9
373     go1: jnb      beat,go1
374          clr      beat
375          mov      a,r3
376          mov      dptr,#lites-2
377          movc     a,@a+dptr
378          mov      p3,a            ; update lite
379          djnz     r3,go1          ; wait for 3 seconds to elapse
380          mov      p3,#$ff         ; lites off
        ;------------------------
        ; Play a little "end of game" tune
        ;------------------------
             mov      dptr,#tune      ; play a little ditty...
             mov      r3,#0
             mov      tempo,#halfsec/6
             acall    enable_tempo_timer
             setb     TR
        tu1: mov      a,r3
             clr      c
             rlc      a
             push     $E0             ; "PUSH A"
             movc     a,@a+DPTR
             mov      rth,a
             mov      TH,a
             pop      $E0             ; "POP A"
397          inc      a
398          movc     a,@a+DPTR
399          mov      rtl,a
400          mov      TL,a
401     tu2: jnb      beat,tu2
402          clr      beat
403          inc      r3
404          mov      a,r3
405          cjne     a,#7,tu1
406          clr      TR              ; timer off
407          setb     spkr_bit        ; spkr off
408          clr      TIrun
409     ;
410     ; if button still down, wait for release
411     ;
```

```
412  bck:    jnb     the_button,bck
413          mov     r3,#0
414  dbk:    djnz    r3,dbk          ; debounce
415  ;
416  ; enter idle state until button pressed again
417  ;
418          mov     a,score
419          mov     b,#6            ; score/6
420          div     ab              ; A=quotient, B=remainder
421          cjne    a,#8,$+3        ; overflowed?
422          jc      sp2             ; 7 or less
423          mov     a,#7            ; max allowed
424  sp2:    mov     blink_val,a
425          jmp     flash_it
426  ;————————————————
427  ; Blink the score every 3 seconds, wait
428  ; for the button to start a new game
429  ;————————————————
430  blink_wait:
431          mov     dptr,#lites
432          mov     tempo,#0        ; .88 sec TC
433          mov     r3,#4
434          clr     pbut            ; pushbutton flag
435          setb    EX0             ; enable pb interrupt
436          acall   enable_tempo_timer  ; start timer1 & clear beat flag
437  blink:  mov     pcon,#1         ; zzzzzzzzzzzzz
438          jnb     pbut,bb2        ; Pbut still up
439          jmp     new_game
440  bb2:    jnb     beat,blink
441          clr     beat
442          djnz    r3,blink
443  ;
444  flash_it:
445          mov     dptr,#lites
446          mov     a,blink_val
447          movc    a,@a+dptr
448          mov     p3,a            ; lite on
449          mov     tempo,#halfsec/20
450          acall   enable_tempo_timer
451  blk2:   jnb     beat,blk2
452          mov     p3,#$FF         ; lites off
453          jmp     blink_wait
454
455  ;————
456  ; SUBROUTINES
457  ;————
458  ;
459  ;————
460  ; Make a razz sound
461  ;————
462  razz:   mov     rth,#$F2
463          mov     TH,#$F2
464          mov     rtl,#$3C
465          mov     TL,#$3C
466          setb    TR              ; spkr on
467          mov     r5,#bigdel      ; wait a bit
468          acall   delay
469          clr     TR
470          setb    spkr_bit        ; spkr off
```

```
471         ret
472 ;————————
473 ; Beep out the score
474 ;————————
475 beep_score:
476         mov     a,score
477         cjne    a,#0,contin     ; skip a score of 0
478         ret
479 ;
480 contin: mov     r5,#bigdel      ; build up the suspense
481         acall   delay
482         mov     r3,#0           ; score counter
483 beeploop:
484         mov     dptr,#k1        ; first note of beep sequence
485         mov     a,r3
486         cjne    a,#8,$+3
487         jnc     more_than_7
488         jmp     beep2
489 more_than_7:
490         cjne    a,#15,$+3
491         jnc     more_than_14
492         mov     dptr,#k2        ; second note
493         jmp     beep2
494 more_than_14:
495         cjne    a,#22,$+3
496         jnc     more_than_21
497         mov     dptr,#k3        ; third note
498         jmp     beep2
499 more_than_21:
500         cjne    a,#29,$+3
501         jnc     more_than_28
502         mov     dptr,#k4        ; fourth note
503         jmp     beep2
504 more_than_28:
505         cjne    a,#36,$+3
506         jnc     more_than_35   ; we have a genius here!
507         mov     dptr,#k5
508         jmp     beep2
509 more_than_35:
510         mov     dptr,#k6
511 ;
512 beep2:
513         mov     a,#0            ; get the note
514         movc    a,@a+dptr       ; high byte
515         mov     TH,a            ; load into timer regs
516         mov     rth,a
517         mov     a,#1            ; low byte
518         movc    a,@a+dptr
519         mov     TL,a
520         mov     rtl,a
521 ;
522         mov     tempo,#score_tempo
523         acall   enable_tempo_timer
524         setb    TR              ; pitch timer on-make a beep
525         mov     a,r3            ; update the lights
526         anl     a,#$1F          ; mod32
527         mov     dptr,#lites
528         movc    a,@a+dptr
```

```
529         mov     p3,a            ; one light on
530  wx1:   mov     pcon,#1         ; zzzzzzzzzzzzzzz
531         jnb     beat,wx1        ; wait for beat
532         clr     beat
533         clr     TR              ; sound off
534         setb    spkr_bit
535  wx2:   mov     pcon,#1
536         jnb     beat,wx2        ; wait for rest to end
537         clr     beat
538         inc     r3
539         mov     a,r3
540         cjne    a,score,beeploop
541         mov     r5,#bigdel
542         acall   delay
543         mov     p3,#0FFh        ; lites out
544         ret
545  ;------------------------
546  ; Delay: call with delay constant in R5
547  ;------------------------
548  delay: mov     tempo,#halfsec/5
549         acall   enable_tempo_timer
550  del1:  mov     pcon,#1         ; zzzzzzzzzzzzzz
551         jnb     beat,del1       ; wake up here
552         clr     beat
553         djnz    r5,del1
554         clr     TIrun           ; turn off & clear timerl
555         ret
556  ;------------------------
557  ; Make a "zip" sound. Uses R0. Used to
558  ; indicate round score after each round
559  ;------------------------
560  Zip:   mov     rth,#$FA
561         mov     TH,#$FA
562         mov     rtl,#$00
563         mov     TL,#$00
564         mov     r0,#20          ; this many steps
565         setb    TR              ; timer on
566         mov     tempo,#2
567         acall   enable_tempo_timer
568  z1:    mov     pcon,#1         ; zzzzzzzzzzzz
569         jnb     beat,z1         ; wait for "beat" interrupt
570         clr     beat
571         mov     a,rtl
572         add     a,#$44
573         mov     rtl,a
574         jnc     noflo
575         inc     rth
576  noflo: djnz    r0,z1
577         clr     TR
578         setb    spkr_bit
579         ret
580  ;------------------------
581  ; Enable the tempo timer Timerl
582  ; Reset the timer, clear the beat flag,
583  ; then start the timer.
584  ;------------------------
585  enable_tempo_timer:
586         clr     TIRun           ; reset the timer
587         mov     r7,tempo        ; initialize TITimer Intr. counter
```

```
588             clr     beat            ; clear beat flag
589             setb    TlRun           ; start the timer
590             ret
591     ;———
592     play_a_note:
593     ;———
594     ; Call with note number in note_value.
595     ; Play the note and turn on the appropriate light,
596     ; only if with.lites flag=1 then play a
597     ; rest with the lights off.
598     ;
599             clr     beat
600             mov     a,round         ; 0-27
601             mov     dptr,#interval_table
602             movc    a,@a+dptr       ; a now = scale offset
603             mov     r3,a            ; temp
604             mov     a,note_value
605             jb      bach_round,pn2  ; don't use interval if bach round
606             movc    a,@a+dptr       ; 0-6 -> 0-11
607     pn2:    add     a,r3            ; pitch table index
608     ;
609             clr     c
610             rlc     a               ; times 2 (16-bit values)
611             mov     r3,a            ; temp
612             mov     dptr,#pitch_table
613             movc    a,@a+dptr
614             mov     rth,a           ; update reload H
615             mov     TH,a            ; and counter H
616             mov     a,r3            ; get it back
617             inc     a               ; lo byte of 16-bit word
618             movc    a,@a+dptr       ; get lo byte
619             mov     rtl,a           ; update reload L
620             mov     TL,a            ; and counter L
621     ;
622     ; Update the lites if with_lights flag is 1
623     ;
624     nowait: setb    TR              ; start Timer0
625             jnb     with_lites,wait
626             mov     dptr,#lites     ; normal light table
627             mov     a,note_value
628             jnb     bach_round,norm ; don't overwrite dptr
629             mov     dptr,#bach_lites ; do
630     norm:   movc    a,@a+DPTR       ; turn on a light
631             mov     p3,a
632     ;
633     ; leave note on until beat flag=1
634     ;
635     wait:   mov     pcon,#1         ; zzzzzzzzzzzz
636             jnb     beat,wait
637             clr     beat            ; clear the flag
638     ;
639     ; Play a rest (same duration as note), turn off lites
640     ;
641             clr     TR              ; stop the timer
642             setb    spkr_bit        ; spkr OFF
643             mov     p3,#0FFh        ; lites off
644     wait2:  mov     pcon,#1         ; zzzzzzzzzzzz
645             jnb     beat,wait2      ; any interrupt takes us here
646             clr     beat
```

```
647         ret                     ; all done
648   ;
649   ;------------------------
650   ; Update Stream
651   ; Call with new note value in note_val
652   ;------------------------
653   update_stream:
654         mov    s1,s2
655         mov    s2,s3
656         mov    s3,s4
657         mov    s4,note_value
658         ret
659   ;-----------
660   ; Score the round
661   ;-----------
662   score_round:
663         mov    a,n3
664         cjne   a,s3,no_hit
665         mov    a,n2
666         cjne   a,s2,no_hit
667         mov    a,n1
668         cjne   a,s1,no_hit
669         mov    score_val,#1    ; missed by 1 (1 offset into score table)
670         jmp    adjust
671   ;
672   no_hit: mov   a,n1
673         cjne   a,s2,miss
674         mov    a,n2
675         cjne   a,s3,miss
676         mov    a,n3
677         cjne   a,s4,miss
678         mov    score_val,#0    ; a hit! (0 offset into score table)
679         jmp    adjust
680   miss:  mov    score_val,#-2
681         ret
682   adjust: mov   dptr,#score_table
683         mov    a,round          ; round counter
684         clr    c
685         rlc    a                ; times 2
686         add    a,score_val      ; plus offset (0 or 1)
687         movc   a,@a+dptr        ; get score value by round
688         jb     with_lites,nobono
689         swap   a
690   nobono: anl   a,#$0F
691         mov    score_val,a
692         ret
693   ;------------------
694   ; Random Number Generator
695   ;------------------
696   random: clr   c
697         mov    a,randL
698         rlc    a
699         mov    randL,a
700         mov    a,randH
701         rlc    a
702         mov    randH,a
703         jnc    rand_exit
704         xrl    randH,#1DH
```

```
705            xrl     randL,#87H
706  rand_exit:
707            mov     a,randL
708            ret
709  ;
710  ; Reset the random generator
711  ;
712  reset_RNG:
713            mov     randL,seedL
714            mov     randH,seedH
715            mov     d1,seedL
716            mov     d2,seedH
717            mov     d3,seedL
718            mov     d4,seedH
719            mov     mask,seedH
720            ret
721  ;————————
722  ; 1/f noise generator
723  ;————————
724  ; Returns with note value
725  ; in a, also in note_value
726  ;
727  die_ptr      equ   0         ; R0
728  die_ctr      equ   1         ; R1
729  shift_mask   equ   2         ; R2
730  ;
731  oof:   mov    die_ptr,#D1    ; point to die #1
732         mov    die_ctr,#4     ; loop counter
733         mov    a,mask
734         inc    mask
735         xrl    a,mask
736         mov    shift_mask,a
737  ;
738  toss:  mov    a,shift_mask
739         rrc    a
740         mov    shift_mask,a
741         jnc    again
742         acall  random
743         anl    a,#07h
744         mov    @r0,a          ; (r0=die_ptr) update the die
745  again: inc    die_ptr        ; point to next die
746         djnz   die_ctr,toss   ; go again
747  ;
748  ; Sum the 4 dice
749  ;
750         mov    die_ptr,#d1
751         mov    die_ctr,#4
752         clr    a
753  add_loop:
754         add    a,@r0          ; (r0=die_ptr)
755         inc    die_ptr
756         djnz   die_ctr,add_loop
757         anl    a,#07H
758         mov    note_value,a
759         ret
760  ;————————
761  ; light patterns for showing score
762  ; after each round. "0" = ON.
763  ;————————
```

```
764  lites:  db    11111110b    ; 0
765         db    11111101b    ; 1
766         db    11111011b    ; 2
767         db    11110111b    ; 3
768         db    11101111b    ; 4
769         db    11011111b    ; 5
770         db    10111111b    ; 6
771         db    01111111b    ; 7
772         db    10111111b    ; 8
773         db    11011111b    ; 9
774         db    11101111b    ; 10
775         db    11110111b    ; 11
776         db    11111011b    ; 12
777         db    11111101b    ; 13
778         db    11111110b    ; 14
779         db    11111101b    ; 15
780         db    11111011b    ; 16
781         db    11110111b    ; 17
782         db    11101111b    ; 18
783         db    11011111b    ; 19
784         db    10111111b    ; 20
785         db    01111111b    ; 21
786         db    10111111b    ; 22
787         db    11011111b    ; 23
788         db    11101111b    ; 24
789         db    11110111b    ; 25
790         db    11111011b    ; 26
791         db    11111101b    ; 27
792         db    11111110b    ; 28
793         db    11111101b    ; 29
794         db    11111011b    ; 30
795         db    11110111b    ; 31
796         db    11101111b    ; 32
797         db    11011111b    ; 32
798         db    10111111b    ; 34
799         db    01111111b    ; 35
800         db    10111111b    ; 36
801         db    11011111b    ; 37
802         db    11101111b    ; 38
803         db    11110111b    ; 39
804         db    11111011b    ; 40
805         db    11111101b    ; 41
806         db    11111110b    ; 42
807  ;————————————————
808  ; Pitch intervals for equally tempered scale
809  ;————————————————
810  interval_table:
811         db    0
812         db    2
813         db    4
814         db    5
815         db    7
816         db    9
817         db    11
818  ;
819         db    12
820         db    14
821         db    16
822         db    17
```

```
823         db    19
824         db    21
825         db    23
826     ;
827         db    24
828         db    26
829         db    28
830         db    29
831         db    31
832         db    33
833         db    35
834     ;
835         db    36
836         db    38
837         db    40
838         db    41
839         db    43
840         db    45
841         db    47
842     ;
843         db    48
844     ;————————————————————————
845     ; Table of pitch constants, using 4.9152 MHz crystal
846     ; "k" labels are notes used to accompany scoring
847     ; sequence
848     ;————————————————————————
849     pitch_table:
850         dw    0FCF0H   ;   C
851         dw    0FD1CH   ;   C#
852         dw    0FD46H   ;   D
853         dw    0FD6DH   ;   Eb
854         dw    0FD92H   ;   E
855         dw    0FDB5H   ;   F
856         dw    0FDD5H   ;   F#
857         dw    0FDF5H   ;   G
858         dw    0FE12H   ;   Ab
859         dw    0FE2EH   ;   A
860         dw    0FE48H   ;   Bb
861         dw    0FE60H   ;   B
862
863     k1: dw    0FE78H   ; 523 C
864         dw    0FE8EH   ; 554 C#
865         dw    0FEA2H   ; 587 D
866         dw    0FEB6H   ; 622 Eb
867     k2: dw    0FEC8H   ; 659 E
868         dw    0FEDAH   ; 698 F
869         dw    0FEEAH   ; 740 F#
870     k3: dw    0FEFAH   ; 784 G
871         dw    0FF08H   ; 831 Ab
872         dw    0FF16H   ; 880 A
873         dw    0FF23H   ; 932 Bb
874         dw    0FF30H   ; 988 B
875     ;
876     k4: dw    0FF3BH   ; 1047 C
877         dw    0FF46H   ; 1109 C#
878         dw    0FF51H   ; 1175 D
879         dw    0FF5AH   ; 1245 Eb
880     k5: dw    0FF64H   ; 1319 E
```

```
881         dw    0FF6CH    ; 1397 F
882         dw    0FF75H    ; 1480 F#
883   k6:   dw    0FF7CH    ; 1568 G
884         dw    0FF84H    ; 1661 Ab
885         dw    0FF8BH    ; 1760 A
886         dw    0FF91H    ; 1865 Bb
887         dw    0FF97H    ; 1976 B
888   ;
889   k7:   dw    0FF9DH    ; 2093 C
890         dw    0FFA3H    ; 2217 C#
891         dw    0FFA8H    ; 2349 D
892         dw    0FFADH    ; 2489 Eb
893         dw    0FFB1H    ; 2637 E
894         dw    0FFB6H    ; 2794 F
895         dw    0FFBAH    ; 2960 F#
896         dw    0FFBEH    ; 3136 G
897         dw    0FFC1H    ; 3322 Ab
898         dw    0FFC5H    ; 3520 A
899         dw    0FFC8H    ; 3729 Bb
900         dw    0FFCBH    ; 3951 B
901   ;
902   k8:   dw    0FFCEH    ; 4186 C
903         dw    0FFD1H    ; 4435 C#
904         dw    0FFD3H    ; 4699 D
905         dw    0FFD6H    ; 4978 Eb
906         dw    0FFD8H    ; 5274 E
907         dw    0FFDAH    ; 5588 F
908         dw    0FFDCH    ; 5920 F#
909         dw    0FFDEH    ; 6272 G
910         dw    0FFE0H    ; 6645 Ab
911         dw    0FFE2H    ; 7040 A
912         dw    0FFE4H    ; 7459 Bb
913         dw    0FFE5H    ; 7902 B
914   ;
915         dw    0FFE7H    ; 8372
916         dw    0FFE8H    ; 8870
917         dw    0FFE9H    ; 9397
918         dw    0FFEAH    ; 9956
919         dw    0FFECH    ; 10548
920         dw    0FFEDH    ; 11175
921         dw    0FFEEH    ; 11840
922         dw    0FFEFH    ; 12544
923         dw    0FFF0H    ; 13290
924         dw    0FFF0H    ; 14080
925         dw    0FFF1H    ; 14917
926         dw    0FFF2H    ; 15804
927   ;
928         dw    0FFF3H    ; 16744
929   ;----------------------------------
930   ; Table of score values by round
931   ; Format: upper 4-bits = score with lites off,
932   ;         lower 4-bits = score with lites on
933   ; 2 entries: first for hit, second for miss by 1
934   ;----------------------------------
935   score_table:
936         db    $32       ; round 1
937         db    $21
938         db    $32       ; round 2
939         db    $21
```

```
        db      $32     ; round 3
        db      $21
        db      $32     ; round 4
        db      $21
        db      $32     ; round 5
        db      $21
        db      $32     ; round 6
        db      $21
        db      $32     ; round 7
        db      $21
        db      $32     ; round 8
        db      $21
;
        db      $43     ; round 9
        db      $21
        db      $43     ; round 10
        db      $21
        db      $53     ; round 11
        db      $32
        db      $53     ; round 12
        db      $32
        db      $63     ; round 13
        db      $32
        db      $63     ; round 14
        db      $32
        db      $63     ; round 15
        db      $32
        db      $74     ; round 16
        db      $32
;---------------------------------------
; The little tune played at the end of the game
;---------------------------------------
tune:
        dw      $FE98
        dw      $FE83
        dw      $FE98
        dw      $FE3B
        dw      $0000   ; rest
        dw      $FE98
        dw      $FD59
;---------------------------------------
; From Bach Cello Suite No. 1 in G Major
; (skipping repeats every other measure)
;---------------------------------------
bach_melody:
        db      1
        db      8
        db      17
        db      15
        db      17
        db      8
        db      17
        db      8
;
        db      1
        db      10
        db      18
        db      17
        db      18
```

```
999             db      10
1000            db      18
1001            db      10
1002    ;
1003            db      1
1004            db      12
1005            db      18
1006            db      17
1007            db      18
1008            db      12
1009            db      18
1010            db      12
1011    ;
1012            db      1
1013            db      13
1014            db      17
1015            db      15
1016            db      17
1017            db      13
1018            db      17
1019            db      13
1020    ;————————————————
1021    ; Translate the eight bach notes into sequential lites
1022    ;————————————————
1023    bach_lites:
1024            db      11111111b       ; note 0
1025            db      11111110b       ; note 1*
1026            db      11111111b       ; note 2
1027            db      11111111b       ; note 3
1028            db      11111111b       ; note 4
1029            db      11111111b       ; note 5
1030            db      11111111b       ; note 6
1031            db      11111111b       ; note 7
1032            db      11111101b       ; note 8 *
1033            db      11111111b       ; note 9
1034            db      11111011b       ; note 10*
1035            db      11111111b       ; note 11
1036            db      11110111b       ; note 12*
1037            db      11101111b       ; note 13*
1038            db      11111111b       ; note 14
1039            db      11011111b       ; note 15*
1040            db      11111111b       ; note 16
1041            db      10111111b       ; note 17*
1042            db      01111111b       ; note 18*
1043    ;
1044            END
1045
```

Appendix B

```
1       $paginate pagewidth=120 pagelength=76 date
2       $linenums
3       ;————
4       ; Maestro ver 1.0
5       ;————
6       ;
7       ; Reserved registers during round:
8       ;               R7—tempo counter (incremented in Timer1 interrupt routine).
9       ;               R6—round note counter, decrements to 0
```

```
10      ;
11      ; ——
12      ; Constants
13      ; ——
14      maxnotes        equ     36              ; play this many every round
15      maxround        equ     7               ; game over if miss after this round
16      score_tempo     equ     $10             ; for the beep-beep-beep scoring
17      start_tempo     equ     $48             ; game tempo starts here
18      speedup_factor  equ     $04             ; subtract this from game tempo every round
19      bigdel          equ     10              ; long delay (half seconds)
20      meddel          equ     3               ; medium delay (half seconds)
21      halfsec         equ     146             ; timerl .5 sec tempo value
22      bit_time        equ     170             ; 1200 baud, 4.9152 MHz xtal
23      ;
24      x1P             equ     0               ; one player offset
25      x2PM            equ     2               ; 2 player master offset
26      x2PS            equ     4               ; 2 player slave offset
27      ;
28      spkr_bit        equ     p1.0
29      timer_on        equ     08Ch            ; TCON.4
30      CLRTI           equ     $DD
31      TR              equ     $8C
32      TIRUN           equ     $DC
33      ETI             equ     $AB
34      RTL             equ     $8B
35      RTH             equ     $8D
36      TL              equ     $8A
37      TH              equ     $8C
38      ;
39      ; Bits unique to '751
40      ;
41      IE0             teq     $8B             ; "teq" because reassigning
42      IT0             teq     $8A             ; 8051 resources
43      IE1             teq     $89
44      IT1             teq     $88
45      TF              equ     $8D
46      ; ——
47      ; RAM variables
48      ; ——
49      seedH           equ     1EH             ; watch stack!
50      seedL           equ     seedH+1
51      randH           equ     seedL+1
52      randL           equ     randH+1
53      mask            equ     randL+1
54      flags           equ     mask+1
55      flags2          equ     flags+1
56      flags3          equ     flags2+1
57      TI_mode         equ     flags3+1
58      score_byte      equ     TI_mode+1
59      xscore_byte     equ     score_byte+1
60      score_val       equ     xscore_byte+1
61      xscore_val      equ     score_val+1
62      d1              equ     xscore_val+1
63      d2              equ     d1+1
64      d3              equ     d2+1
65      d4              equ     d3+1
66      note_value      equ     d4+1
67      target_note_num equ     note_value+1
68      s4              equ     target_note_num+1
```

```
69   s3              equ    s4+1
70   s2              equ    s3+1
71   s1              equ    s2+1
72   n3              equ    s1+1
73   n2              equ    n3+1
74   n1              equ    n2+1
75   game_tempo      equ    n1+1
76   tempo           equ    game_tempo+1
77   score           equ    tempo+1
78   note_ctr        equ    score+1
79   round           equ    note_ctr+1
80   blink_val       equ    round+1
81   Rx_byte         equ    blink_val+1
82
83   ;————
84   ; Bit variables
85   ;————
86   beat            equ    flags.0
87   pbut            equ    flags.1
88   with_lites      equ    flags.2
89   bach_round      equ    flags.3
90   bach_ff         equ    flags.4        ; play bach only once per round
91   razz_flag       equ    flags.5        ; indicates any miss in a round
92   uart_error      equ    flags.6
93   ACK             equ    flags.7        ; 1=UART send was acknowledged by receiver
94   ;
95   slave           equ    flags2.0
96   T2_state        equ    flags2.1
97   bus_pulses      equ    flags2.2       ; enable=1
98   round_in_prog   equ    flags2.3
99   rest            equ    flags2.4
100  needs_reset     equ    flags2.5
101  twoplayer       equ    flags2.6
102  gameover        equ    flags2.7
103  ;
104  hit_bit         equ    flags3.0
105  miss_bit        equ    flags3.1
106  past_max_round  equ    flags3.2
107  master_won      equ    flags3.3
108  slave_won       equ    flags3.4
109  I_won           equ    flags3.5
110  TI_needs_service equ   flags3.6
111  sound_on        equ    flags3.7
112  ;
113  switch          equ    p1.1           ; pin 14-lites on/off switch
114  bothmissed      equ    p1.2           ; test for 2 plyr game over
115  the_button      equ    p1.5           ; pin 18 (int0)-momentary pushbutton
116  net_bit_in      equ    p1.6           ; pin 19
117  net_bit_out     equ    p0.0           ; pin 8
118  lite_port       equ    p3
119  win_lite        equ    p1.7           ; pin 20
120  ;
121  ; Macros
122  ;
123  wait_clear      %macro
124                  %local loop
125  loop:           jnb    net_bit_in,loop
126                  %endm
127
```

```
128     bus_HI          %macro
129                     setbnet_bit_out
130                     %endm
131
132     bus_LO          %macro
133                     clrnet_bit_out
134                     %endm
135
136     check           %macro
137                     jnb     TF,$+7
138                     cpl     spkr_bit
139                     clr     TF
140                     %endm
141     ;
142                     defseg  maes,absolute
143                     seg     maes
144                     org     0
145     ;————
146     ; Interrupt Vectors
147     ;————
148                     jmp     pwr_on                  ; reset
149     ;————
150     ; Pushbutton interrupt
151     ;————
152                     org     003h                    ; INT0
153                     clr     EA                      ; all int's off
154                     clr     EX0                     ; disable the int0 interrupt (PB)
155                     jmp     continue_PBint          ; get timing info for scoring
156     ;
157                     org     00Bh                    ; Timer 0
158                     cpl     spkr_bit
159                     reti
160                     db      "Mv1.0"
161     ;————
162     ; Network input interrupt INT1
163     ;————
164                     org     013h                    ; INT1/p1.6
165                     clr     TIRun                   ; clear Timerl (for reaction timer)
166                     setb    TIRun                   ; start it again
167                     jmp     finish_int1
168     ;
169                     org     01Bh                    ; Timer I
170     ;————
171     ; Timer I used for tempo counter
172     ;————
173     ; TI_mode byte:  7 6  5   4   3   2    1    0
174     ;                0 0  T3  T2  T1  2PS  2PM  1P
175     ;————
176                     setb    CLRTI                   ; clear interrupt
177                     jnb     bus_pulses,TI_1P
178                     jb      TI_mode.0,TI_1P
179                     jb      TI_mode.1,TI_2PM
180                     jb      TI_mode.2,TI_2PS
181                     jb      TI_mode.3,TI_T1
182                     jb      TI_mode.4,TI_T2
183     TI_T3:          bus_HI
184                     check                           ; insert check only after critical timing
185                     mov     TI_mode,#0
186                     jb      slave,T3J
```

```
187                         setb    TI_mode.1              ; master next
188                         reti
189     T3J:                setb    TI_mode.2              ; slave next
190                         reti
191     ;
192     TI_1P:              djnz    r7,TI_ex
193                         setb    beat
194                         check
195                         mov     r7,tempo
196     TI_ex:              reti
197     ;
198     TI_2PM:             djnz    r7,TI_ex
199                         setb    beat
200                         mov     r7,tempo
201                         bus_lo
202                         check
203                         mov     TI_mode,#0
204                         setb    TI_mode.3              ; T1 next
205                         reti
206     ;
207     TI_2PS:
208                         dec     r7
209                         reti
210     ;
211     TI_T1:
212                         mov     TI_mode,#0
213                         setb    TI_mode.4              ; T2 next
214                         jb      round_in_prog,TI_ex
215                         bus_HI
216                         reti
217     ;
218     TI_T2:
219                         push    psw
220                         mov     c,net_bit_in
221                         mov     T2_state,c
222                         check
223                         mov     TI_mode,#0
224                         setb    TI_mode.5; T3 next
225                         pop     psw
226                         reti
227     ;
228     ;————————————————
229     finish_int1:
230                         setb    CLRTI                  ; reset flag in case it's set
231                         setb    beat                   ; emulate the TimerI tempo clock
232                         mov     r7,tempo
233                         bus_LO
234                         mov     TI_mode,#00001000b     ; start T1-T3 sequence
235                         reti
236     ;
237     continue_PBint:
238                         setb    pbut                   ; pushbutton interrupt flag
239                         mov     score_byte,#0
240                         push    acc
241                         push    psw
242                         mov     a,r7; get six MSB's
243                         clr     c
244                         rrc     a; use 5 MSB's
245                         mov     score_byte,a
```

```
246                 mov     c,rest
247                 jc      pb_ex                   ; bigger number is faster time
248                 setb    score_byte.5            ; set rest bit
249     ;
250     pb_ex:      pop     psw
251                 pop     acc
252                 setb    EA                      ; int's back on (for note timer)
253                 reti
254     ;
255     ; +++++++++++++++
256     ; Start of Program
257     ; +++++++++++++++
258     pwr_on:     mov     tcon,#00000001b         ; int0:level(sw), int1:edge(bus)
259                 mov     score,#0                ; for initial blinking
260                 setb    win_lite                ; win light off
261                 wait_clear                      ; If bus lo, wait for HI-ignore any
262                                                 ; pulses in progress
263     new_game:   mov     IE,#0                   ; all int's disabled and EA off
264                 bus_HI                          ; ready
265                 acall   init_game
266     ;
267                 mov     T1_mode,#00000001b      ; 1 player for pre-game timing
268     ;
269     ; figure out score blink value [0-7]
270     ;
271                 mov     a,score
272                 mov     b,#6                    ; score/6
273                 div     ab                      ; A=quotient, B=remainder
274                 cjne    a,#8,$+3                ; overflowed?
275                 jc      sp2                     ; 7 or less
276                 mov     a,#7                    ; max allowed
277     sp2:        mov     blink_val,a
278                 mov     tempo,#$20              ; TC for pre-game activities
279                 acall   enable_tempo_timer      ; ETI
280                 setb    EA                      ; interrupts on for timer
281                 sjmp    flash_it                ; do first flash right away then wait
282     ;
283     ; Blink the score while waiting for button or active bus (L).
284     ; Then determine (a) single player game, (b) two player-master,
285     ; or (c) two player-slave.
286     ;
287     blink_wait: acall   random
288                 mov     pcon,#1                 ; zzzzzzzzzzzzzzzz
289                 jnb     the_button,single_player
290                 jnb     net_bit_in,slave_ack
291     ;
292     ; It's a Timer1 interrupt.
293     ;
294                 jnb     beat,blink_wait
295                 clr     beat
296                 djnz    r3,try_master
297     flash_it:   mov     r3,#24                  ; re-init "off" T.C.
298                 mov     dptr,#lites
299                 mov     a,blink_val
300                 movc    a,@a+dptr
301                 mov     lite_port,a             ; one light on
302     ;
303                 mov     r0,#0                   ; blink "on" T.C.
304                 mov     r1,#2
```

```
305   fi2:            jnb    net_bit_in,slave_ack
306                   djnz   r0,fi2
307                   djnz   r1,fi2
308                   mov    lite_port,#$ff          ; all lites off
309                   sjmp   blink_wait
310   try_master:     acall  random                  ; 3:4 odds that we'll send a pulse
311                   anl    a,#$03
312                   jz     blink_wait              ; don't try this time
313   ;
314   ; Send pulse in attempt to become the bus master
315   ;
316                   bus_LO
317                   acall  debounce                ; 1T
318                   bus_HI
319                   jb     net_bit_in,blink_wait   ; it's still high
320   ;
321   ; Pulse was acknowledged--two player master game
322   ;
323                   setb   twoplayer
324                   clr    slave
325                   clr    win_lite                ; show "connect"
326                   sjmp   play_new_game
327   ;
328   slave_ack:      bus_LO
329                   acall  debounce
330                   acall  debounce                ; 2T
331                   bus_HI
332                   setb   twoplayer
333                   setb   slave
334                   clr    win_lite                ; show "connect"
335                   sjmp   play_new_game
336   ;
337   single_player:  clr    twoplayer
338                   acall  debounce
339   ;————————————————————————
340   ;
341   play_new_game:  mov    score,#0
342   new_round:      acall  sync
343                   clr    bus_pulses
344                   clr    round_in_prog           ; not playing yet
345                   mov    seedH,randH
346                   mov    seedL,randL
347                   acall  reset_RNG               ; seeds and polys initialized
348   ;
349                   jnb    twoplayer,preview_wait  ; go right to preview
350   ;
351   ; Send RND initialization from master to slave
352   ;
353                   jb     slave,sync_slave
354                   mov    a,seedH                 ; we're the master
355                   acall  Tx                      ; send first byte
356                   mov    a,seedL
357                   acall  Tx                      ; send second byte
358                   sjmp   preview_wait
359   ;
360   sync_slave:     acall  Rx                      ; get first byte
361                   mov    seedH,a
362                   acall  Rx                      ; get second byte
363                   mov    seedL,a                 ; keep bus busy
```

```
364                     acall   reset_RNG
365         ;
366         ; Wait for button down.
367         ;
368         preview_wait:   bus_LO
369                         acall   init_round
370                         clr     ETI                     ; Timerl off (PB only intr allowed)
371                         setb    EX0                     ; enable PB int
372                         mov     pcon,#1                 ; zzzzzzzzzzzzzzz
373         ;
374         ; Continues here when pb pressed
375         ;
376                         setb    win_lite                ; lites off
377                         clr     pbut                    ; clear pushbutton flag
378                         clr     TR                      ; reset timer0 (pitch)
379                         setb    ET0                     ; enable timer0 interrupt
380                         clr     Tlrun                   ; reset timer 1 (tempo)
381                         setb    ETI                     ; enable timer 1 interrupt IE.3
382         ;
383                         setb    EA                      ; interrupts ON
384         ;
385         ; Play the preview sequence
386         ;
387         preview:        bus_LO                          ; indicate busy
388                         mov     c,switch                ; copy switch flag -> with_lites flag
389                         mov     with_lites,c            ; (remembers state thru preview sequence)
390         pv2:            mov     tempo,game_tempo
391                         acall   enable_tempo_timer
392                         mov     note_value,n1
393                         acall   play_a_note
394                         mov     note_value,n2
395                         acall   play_a_note
396                         mov     note_value,n3
397                         acall   play_a_note
398         ;
399         ; If button down, wait for it to be released
400         ;
401         wu1:            jnb     the_button,wu1          ; jump when button is DN
402                         acall   debounce
403         ;
404         ; If button pushed within about 3 seconds, preview again.
405         ; If not, see if clear to start the round.
406         ;
407                         mov     tempo,#halfsec          ; .5 sec ticks
408         wdx:            mov     r3,#6                   ; 3 seconds
409                         acall   enable_tempo_timer
410         wdn:            mov     pcon,#1                 ; zzzzzzzzzzzzzzz
411                         jnb     the_button,preview      ; jump if PB down
412                         jnb     beat,wdn
413                         clr     beat
414                         djnz    r3,wdn
415         ;
416         ; 3 seconds without button
417         ;
418                         bus_HI                          ; show that I'm finished
419         wx4:            jb      net_bit_in,play_round   ; all units finished
420                         jb      the_button,wx4          ; not pushed
421                         sjmp    preview                 ; button was pushed--go again
422         ;--------
```

```
423     ; Start the round
424     ;----------
425     play_round:     acall   reset_RNG               ; reset RNG
426                     mov     tempo,game_tempo
427                     mov     note_ctr,#0
428                     clr     pbut
429                     setb    EX0                     ; enable PB interrupt IRQ0
430     ;
431                     mov     c,switch
432                     mov     with_lites,c            ; switch flag -> with_lites flag
433     ;
434     ; Check for two player game. Tempo: networked-INT0, normal-Timerl
435     ;
436                     jnb     twoplayer,onep          ; single player game
437                     jb      slave,slvgam            ; slave game
438                     mov     Tl_mode,#00000010b      ; set up for 2P master
439                     sjmp    x2PMas                  ; EX1 off, Tl on
440     onep:           mov     Tl_mode,#00000001b      ; 1P Timerl interrupt routine
441     x2PMas:         clr     EX1                     ; one player or 2p/master-net intr off
442                     acall   enable_tempo_timer      ; start the beat timer
443                     sjmp    prewait                 ; start the round
444     slvgam:         clrlE1  ; in case already set
445                     setb    EX1                     ; enable the net_bit_input IRQ
446                     mov     Tl_mode,#00000100       ; 2 player slave routine
447                     acall   enable_tempo_timer
448     ;
449     prewait:        clr     beat
450     wp1:            jnb     beat,wp1                ; wait for first tick before starting
451                     clr     beat                    ; reset the flag
452                     setb    round_in_prog
453                     setb    bus_pulses
454     ;
455     looper:         jnb     bach_round,usual
456                     mov     dptr,#bach_melody       ; get the next note from table
457                     mov     a,note_ctr
458                     movc    a,@a+dptr
459                     mov     note_value,a
460                     sjmp    us2
461     ;
462     usual:          acall   oof
463     us2:            acall   play_a_note
464                     acall   update_stream
465                     inc     note_ctr
466     ;
467     ; Check the pushbutton flag
468     ;
469                     jb      pbut,round_over
470                     djnz    r6,looper               ; not over yet
471     ;
472     ; Fall through if notes ran out (r6=0)
473     ;
474     round_over:     clr     round_in_prog
475                     jnb     twoplayer,contin        ; go ahead
476     allfin:         jnb     T2_state,allfin         ; wait for all to finish
477     ;
478     contin:         clr     EX1                     ; beat timer off
479                     clr     bus_pulses
480                     acall   debounce                ; give slave time to sample T2 time
481                     acall   debounce
```

```
482                 acall    hit_miss            ; update score_byte 2 msbs
483                 acall    score_round         ; this routine wiggles the bus
484         ;
485         ; Update "who won round" light if 2P game only
486         ;
487                 jnb      twoplayer,abc       ; skip it-using lite for "pastmaxround"
488                 bus_LO                       ; hold off other units
489                 jb       slave,slite
490                 mov      c,master_won
491                 cpl      c
492                 mov      win_lite,c
493                 sjmp     abc
494     slite:      mov      c,slave_won
495                 cpl      c
496                 mov      win_lite,c
497         ;
498     abc:        mov      a,score
499                 add      a,score_val
                    jz       make1               ; it's zero-make 1
                    jnb      acc.7,upds          ; it's positive
        make1:      mov      a,#1                ; zero or neg: make 1
        upds:       mov      score,a
        ;
        ; Play the reward sounds
        ;
507                 jb       miss_bit,make_razz
508                 mov      a,score_val
509                 jz       make_beeps          ; 0 score this round: no zips or razz
510         ;
511         ; make N zips, N is round score (N>0)
512         ;
513                 mov      r5,#meddel
514                 acall    delay
515                 mov      r3,score_val
516     zz:         acall    zip
517                 djnz     r3,zz
518                 sjmp     make_beeps
519         ;
520         ; It's -2: make a razz sound. Delay first
521         ; if 1P game
522         ;
523     make_razz:  setb     razz_flag           ; no BACH henceforth
524                 jb       twoplayer,byp2
525                 mov      r5,#bigdel
526                 acall    delay
527     byp2:       acall    razz
528         ;
529     make_beeps: acall    sync                ; so beeps sound together
530                 bus_LO                       ; indicate busy
531     lth:        acall    beep_score
532         ;
533         ;————————————
534         ; Get ready for the next round
535         ; First check gameover flag.
536         ;————————————
537     getrdy:     jb       gameover,game_over
538         ;
539         ; inc round, set past_max_round and show players if past
540         ;
```

```
541                     inc     round
542                     mov     a,round
543                     cjne    a,#maxround,notmax
544     ;
545     ; from now on a miss means game over
546     ;
547                     setb    past_max_round
548                     mov     dptr,#warn_tune
549                     acall   ditty
550                     jb      twoplayer,notmax    ; if 1P game, turn on win_lite
551                     clr     win_lite            ; to indicate past maxround
552     notmax:         mov     a,game_tempo
553                     clr     c
554                     subb    a,#speedup_factor   ; faster...
555                     mov     game_tempo,a
556                     mov     tempo,a
557     ;
558     wt_up:          jnb     the_button,wt_up    ; if button down, wait for up
559                     acall   debounce
560                     clr     TIrun               ; turn off tempo timer Timerl
561                     bus_HI                      ; I'm ready
562                     acall   sync                ; preview together
563                     jnb     twoplayer,nwrd
564                     setb    win_lite; turn off the win light if 2P
565     nwrd:           jmp     new_round
566     ;
567     game_over:      mov     tempo,#halfsec/4
568                     acall   enable_tempo_timer
569                     mov     r3,#9
570     go1:            jnb     beat,go1
571                     clr     beat
572                     mov     a,r3
573                     mov     dptr,#lites-2
574                     movc    a,@a+dptr
575                     mov     p3,a; update lite
576                     djnz    r3,go1              ; wait for 3 seconds to elapse
577                     mov     p3,#$ff             ; lites off
578     ;
579     game_over2:     mov     dptr,#end_tune      ; play a little ditty...
580                     acall   ditty
581     ;
582     ; if button still down, wait for release
583     ;
584     bck:            jnb     the_button,bck
585                     acall   debounce
586     ;
587     ; Wait for clear bus
588     ;
589                     acall   sync
590                     jnb     twoplayer,resume    ; start again if 1Player game
591     ;
592     ; End of a two player game.  Determine who won, flash winner's
593     ; lights, wait for both to press button.
594     ;
595                     jb      slave,slvscor
596                     acall   Rx                  ; master: get slave's score
597                     clr     c
598                     subb    a,score
```

```
599                     jz      both_vic        ; both are victorious
600                     jnc     slave_vic       ; slave won
601     ;master won
602                     setb    I_won
603                     mov     a,#0            ; slave's "I-won" bit=0
604                     sjmp    send_vic
605     both_vic:       setb    I_won
606                     mov     a,#1
607                     sjmp    send_vic
608     slave_vic:      clr     I_won
609                     mov     a,#1
610     send_vic:
611                     acall   Tx
612                     sjmp    end_2p
613     ;
614     ; Slave: send score, get back "who-won" bit
615     ;
616     slvscor:        mov     a,score
617     db1:            acall   Tx
618     db2:            acall   Rx              ; get result
619                     mov     c,acc.0         ; "I-won" bit
620     db3:            mov     I_won,c
621     ;
622     end_2p:         bus_LO                  ; indicate busy
623                     mov     r0,#0           ; low T.C.
624                     mov     r2,#0           ; lite counter
625                     mov     r3,#1           ; blink counter
626                     mov     dptr,#lites
627                     jnb     I_won,lastinit
628                     clr     win_lite        ; turn on win lite
629     lastinit:       mov     r1,#2           ; hi T.C
630     lastloop:       jnb     the_button,start_new
631                     djnz    r0,lastloop
632                     djnz    r1,lastloop
633                     jb      I_won,show_vic
634                     sjmp    lastinit
635     ;
636     show_vic:       mov     a,r2
637                     inc     r2
638                     mov     b,#14
639                     div     ab
640                     mov     a,b             ; get remainder 0-13
641                     cjne    a,#0,notog      ; slow blink the win lite
642                     djnz    r3,notog
643                     mov     r3,#10
644                     cpl     win_lite
645     notog:          movc    a,@a+dptr
646                     mov     lite_port,a     ; sweep 8 lites back and forth
647                     sjmp    lastinit
648     ;
649     start_new:      setb    win_lite        ; turn off the win lite
650                     acall   init_game
651                     jmp     play_new_game   ; start new 2Player game
652     ;
653     resume:         jmp     new_game
654     ;
655     ;────────
656     ; SUBROUTINES
657     ;────────
```

```
658   sync:           setb    net_bit_out
659   sy2:            jnb     net_bit_in,sy2
660                   ret
661   ;
662   ;————————————————
663   ; Score the round.
664   ; Exit with score_val updated. Handles
665   ; both 1P and 2P scoring.
666   ;————————————————
667   score_round:    jnb     twoplayer,scorefor1
668   ;
669                   jb      slave,scorslav
670                   acall   Rx                      ; get slave's score byte
671                   mov     xscore_byte,a
672                   acall   who_won                 ; update score_val, xscore_val
673                   mov     a,xscore_val
674                   acall   Tx                      ; send score result to slave
675                   sjmp    compute_score
676   scorslav:       mov     a,score_byte
677                   acall   Tx                      ; send score byte to master
678                   acall   Rx                      ; get back result
679                   mov     c,acc.7                 ; get "game over" bit
680                   mov     gameover,c              ; update gameover flag
681                   mov     c,acc.6                 ; figure out who won round
682                   mov     master_won,c
683                   mov     c,acc.5
684                   mov     slave_won,c
685                   anl     a,#00011111b            ; clear status bits
686                   mov     score_val,a
687                   sjmp    compute_score
688   scorefor1:      mov     a,score_byte            ; rotate 2msbs into 2lsbs
689                   rl      a
690                   rl      a
691                   anl     a,#00000011b
692                   mov     score_val,a
693                   cjne    a,#2,compute_score      ; jump if not a miss
694                   jnb     past_max_round,compute_score ; jump if not past
695                   setb    gameover                ; it's over
696   compute_score:  mov     a,score_val
697                   cjne    a,#3,chekmiss
698                   mov     score_val,#0            ; tie but slow
699                   ret
700   chekmiss:       jnb     miss_bit,use_table      ; not a miss
701                   mov     score_val,#-2           ; may override this
702                   jnb     past_max_round,cex
703                   mov     score_val,#0            ; make it 0 -past round 8
704   cex:            ret
705   ;
706   use_table:      mov     dptr,#score_table
707                   mov     a,round
708                   clr     c
709                   rlc     a                       ; times 2
710                   add     a,score_val
711                   movc    a,@a+dptr
712                   jb      with_lites,nobono
713                   swap    a
714   nobono:         anl     a,#$0F
715                   mov     score_val,a
716                   jb      twoplayer,nb2           ; no fast react bonus for 2P
```

```
717                     jb      hit_bit,check_bonus     ; and only for a hit
718     nb2:            ret
719     ;
720     check_bonus:    mov     a,score_byte
721                     anl     a,#$3F                  ; get resid count
722                     cjne    a,#$30,$+3
723                     jc      cex
724                     inc     score_val
725                     ret
726     ;────────────────────────────
727     who_won:
728     ;
729     ; uses score_byte, xscore_byte to update score_val
730     ; and xscore_val bytes, and gameover, master_won
731     ; and slave_won bits in xscore_byte. Uses R0.
732     ;────────────────────────────
733                     mov     a,score_byte            ; master's score byte
734                     swap    a                       ; bits 7:6 -> bits 3:2
735                     anl     a,#00001100b            ; 2 msb's of 4-bit index
736                     mov     b,a                     ; temp
737                     mov     a,xscore_byte           ; get slave's score byte
738                     rl      a
739                     rl      a
740                     anl     a,#00000011b            ; 2 lsb's of 4-bit index
741                     orl     a,b
742                     mov     r0,a                    ; save table index in R0
743                     mov     dptr,#multi_score
744                     movc    a,@a+dptr
745                     mov     b,a                     ; b=table value
746                     anl     a,#$07                  ; get 3 lsb's
747                     mov     xscore_val,a            ; built 3 lsb's so far...
748                     mov     a,b                     ; get it back
749                     swap    a
750                     anl     a,#$07
751                     mov     score_val,a             ; 3 lsb's...
752     ;
753     ; the 3 lsb's of score_val bytes are now valid. Next, resolve
754     ; any tie and update the three flags and xscore_val bits:
755     ;
756     ; gameover       xscore_val.7
757     ; master_won     xscore_val.6
758     ; slave_won      xscore_val.5
759     ;
760                     jb      b.7,timeck              ; test TIE flag-if 1 need to check times
761                     jnb     b.3,ww                  ; both missed? NO
762                     jnb     past_max_round,ww       ; past max round?
763     ;
764     ; Both missed, and we're past the max round: game is OVER.
765     ;
766                     clr     master_won
767                     clr     slave_won
768                     setb    gameover                ; YES: set game over flag
769                     setb    xscore_val.7            ; set bit 7 to xmit to slave
770                     ret
771     ;
772     ; Not a tie, and not game over. Figure out who won and
773     ; update flag bits.
774     ;
775     ww:             mov     a,r0                    ; get table index back
```

```
776                 mov    dptr,#wwtab          ; who-won table
777                 movc   a,@a+dptr
778                 mov    c,acc.1              ; master-won bit
779                 mov    master_won,c         ; the flag
780                 mov    xscore_val.6,c       ; update xmit byte
781                 mov    c,acc.0              ; slave-won bit
782                 mov    slave_won,c          ; the flag
783                 mov    xscore_val.5,c
784                 ret
785       ;
786       ; Both players scored the same—
787       ; check reaction times and overwrite the loser's score value
788       ; with 011. If slave won, don't disturb the score value, just
789       ; set the "who won" bits.
790       ;
791       timeck:    mov    a,xscore_byte
792                  anl    a,#00111111b        ; mask off status bits
793                  mov    b,a                 ; temp
794                  mov    a,score_byte
795                  anl    a,#00111111b        ; mask off status bits
796                  clr    c
797                  subb   a,b                 ; score_byte minus xscore_byte
798                  jz     bothwin             ; equal time-both get the score
799                  jc     slavewin            ; score_byte LT xscore_byte
800       ; masterwin
801                  mov    xscore_val,#01000011b ; master won: slave gets 0 points
802                  setb   master_won
803                  clr    slave_won
804                  ret
805       slavewin:
806                  mov    score_val,#3        ; slave won: master gets 0 points
807                  setb   xscore_val.5        ; set flag in byte to xmit to slave
808                  clr    master_won
809                  setb   slave_won
810                  ret
811       bothwin:
812                  setb   master_won
813                  setb   slave_won
814                  setb   xscore_byte.6       ; set bits to xmit to slave
815                  setb   xscore_byte.5       ; (don't disturb score val in 1:0)
816                  ret
817       ;
818       ;————————————————
819       ; Multiple player score resolver table
820       ; Index formed by sb(score byte) and
821       ; xsb(external score byte) as sb:xsb, where
822       ;————————————————
823       ; 00 is a hit
824       ; 01 is a miss by one
825       ; 10 is a miss
826       ; 11 never appears (so last five entries of table not needed)
827       ;
828       ; These translate into:  f mmm b sss, where
829       ;
830       ;   f is tie flag, b is "both missed" flag
831       ;   mmm and sss are score vales as follows:
832       ;
833       ;   hit:  000(becomes index into score table)
```

```
834  ; by1: 001(ditto)
835  ; miss: 010(becomes a score of 0 or -2, round dependent)
836  ; g.o. 011(score of 0-missed by one when other hit OR
837  ;tie was resolved by reaction times, lost)
838  ;
839  ; If f is set, routine subtracts sb and xsb and adjusts
840  ; the loser's score value to 011 to indicate a zero score.
841  ; (player tied with opponent but was slower = 0 score).
842  ;
843  multi_score:
844          db      10000000b       ; 00 00: M hit, S hit -> TIE!
845          db      00000011b       ; 00 01: M hit, S by1 - M win
846          db      00000010b       ; 00 10: M hit  S mis - M win
847          db      0               ; 00 11: -illegal-
848          db      00110000b       ; 01 00: M by1, S hit - S win
849          db      10010001b       ; 01 01: M by1, S by1 -> TIE!
850          db      00010010b       ; 01 10: M by1, S mis - M win
851          db      0               ; 01 11: -illegal-
852          db      00100000b       ; 10 00: M mis, S hit - S win
853          db      00100001b       ; 10 01: M mis, S by1 - S win
854          db      00101010b       ; 10 10: M mis, S mis -> game over!
855                                  ; 10 11: -illegal-
856                                  ; 11 00: -illegal-
857                                  ; 11 01: -illegal-
858                                  ; 11 10: -illegal-
859                                  ; 11 11: -illegal-
860  ;————
861  ; Who won?
862  ;                       MS
863  wwtab:  db      00000000b       ; 00 00
864          db      00000010b       ; 00 01
865          db      00000010b       ; 00 10
866          db      0               ; 00 11
867          db      00000001b       ; 01 00
868          db      00000000b       ; 01 01
869          db      00000010b       ; 01 10
870          db      0               ; 01 11
871          db      00000001b       ; 10 00
872          db      00000001b       ; 10 01
873          db      00000000b       ; 10 10
874  ;
875  ;————
876  debounce:
877  ;————
878          push    03              ; R3
879          mov     r3,#0
880  db23:   djnz    r3,db23
881          pop     03
882          ret
883  ;
884  ;————
885  init_game:
886  ;————
887          clr     bach_ff         ; play bach only once per game
888          clr     razz_flag       ; no misses yet...
889          clr     past_max_round  ; game continues with misses until =1
890          clr     gameover
891          setb    win_lite        ; turn it off
892          mov     game_tempo,#start_tempo ; slowest tempo
```

```
893                     mov     round,#0
894                     clr     bus_pulses              ; pulses only during round
895                     ret
896     ;————
897     init_round:
898     ;————
899     ; Test for special Bach round.
900     ;
901                     acall   reset_RNG               ; set starting point for RNG
902                     clr     bach_round              ; so far not a special round
903                     jb      twoplayer,normal_round  ; Bach on 1 player game only
904                     jb      razz_flag,normal_round  ; no bach if any misses so far
905                     jb      bach_ff,normal_round    ; already played a bach round
906                     mov     a,score
907                     cjne    a,#16,$+3
908                     jc      normal_round            ; score lower than 16
909                     acall   random
910                     anl     a,#$10                  ; test a middle bit
911                     jz      normal_round            ; 50-50 chance
912     ;
913     ; Play the special Bach round.
914     ;
915     bk1:            setb    bach_ff                 ; indicate "did it once already"
916                     acall   random
917                     anl     a,#$7F                  ; 0-127
918                     cjne    a,#29,$+3               ; (start w. 128 to cycle RNG some times)
919                     jnc     bk1                     ; less than 29: go again
920                     mov     target_note_num,a
921                     setb    bach_round              ; set the flag for other routines
922     ;
923     ; Get the three Bach preview notes
924     ;
925                     mov     r3,a                    ; temp
926                     mov     dptr,#bach_melody
927                     movc    a,@a+dptr
928                     mov     n1,a
929                     inc     r3                      ; next note
930                     mov     a,r3
931                     movc    a,@a+dptr
932                     mov     n2,a
933                     inc     r3
934                     mov     a,r3
935                     movc    a,@a+dptr
936                     mov     n3,a
937     ;
938                     mov     r6,#32                  ; maxnotes for this round only
939                     sjmp    init_stream             ; continue
940     ;
941     normal_round:   acall   random
942                     anl     a,#1Fh                  ; 0-31
943                     inc     a                       ; 1-32
944                     mov     target_note_num,a
945                     cjne    a,#29,$+3
946                     jnc     normal_round            ; a >= 29: try again
947                     mov     r3,target_note_num
948     ;
949                     mov     seedL,randL
950                     mov     seedH,randH
```

```
 951                   acall   reset_RNG        ; fix starting point
 952   adv:            acall   oof              ; get three preview notes
 953                   djnz    r3,adv
 954                   mov     n1,a             ; stash first note
 955                   acall   oof
 956                   mov     n2,a             ; second
 957                   acall   oof
 958                   mov     n3,a             ; third
 959                   mov     r6,#maxnotes
 960           ;
 961           ;--------
 962   init_stream:
 963           ;--------
 964                   mov     a,#0FFh          ; initialize stream values
 965                   mov     s1,a             ; so match can't happen
 966                   mov     s2,a
 967                   mov     s3,a
 968                   mov     s4,a
 969                   ret
 970           ;
 971   Rx:
 972           ;------------------------------
 973           ; First set bus hi, and wait for clear bus.
 974           ; Wait for start bit, then read one byte from serial port.
 975           ; Assert the bus (L) when stop bit detected, exit with:
 976           ; A=char, CY=ack_bit =1:ACK received, =0:ACK not received.
 977           ; UART_error flag=0 for no error,=1 for error (A&C not valid).
 978           ; Exits in "busy" state, with bus asserted (L).
 979           ; NOTE: No timeout: will hang if never sees start bit
 980           ; (HI-LO transition).
 981           ;------------------------------
 982                   acall   sync
 983           ;
 984                   clr     UART_error       ; optimistic
 985   set1:           jb      net_bit_in,set1  ; wait for start bit (LO)
 986                   mov     r5,#bit_time/2   ; half a bit time
 987   b1:             djnz    r5,b1            ; wait
 988                   mov     c,net_bit_in     ; get bit
 989                   rlc     a                ; start bit then d7-d0
 990                   mov     r4,#8            ; bit counter
 991   uloop:          mov     r5,#bit_time
 992   ul2:            djnz    r5,ul2
 993                   mov     c,net_bit_in
 994                   rlc     a
 995                   djnz    r4,uloop
 996                   mov     r5,#bit_time
 997   b2:             djnz    r5,b2            ; wait one more bit time for stop bit
 998                   jnb     net_bit_in,error ; stop bit is not a "1": error
 999                   clr     net_bit_out      ; send ACK, hold asserted
1000                   mov     r5,#bit_time     ; wait one more bit time
1001   b3:             djnz    r5,b3            ; (to give sender time to read ACK)
1002                   mov     Rx_Byte,a        ; save the data
1003                   clr     IE1              ; it's been toggling, don't want INT
1004                   ret
1005   error:          setb    UART_error
```

```
1006                        clr     IE1
1007                        ret
1008     ;
1009     Tx:
1010     ;--------------------------
1011     ; Call with byte to send in A (preserved)
1012     ; Waits for clear bus, delays to give slave time
1013     ; to call Rx routine, then sends char in acc.
1014     ; followed by a "1" stop bit (indicates bus clear).
1015     ; Checks for acknowledge (bus low) immed. after
1016     ; sending stop bit. If byte is acknowledged by
1017     ; receiver, sets ACK bit, else clear it.
1018     ; Uses R4,R5, no timer or interrupt resources.
1019     ;--------------------------
1020                        acall   sync
1021                        acall   debounce              ; wait 1T
1022     ;
1023                        setb    c                     ; the stop bit-H (bus ready)
1024                        mov     r4,#9                 ; wait 9 bit times until stop bit sent
1025                        clr     net_bit_out           ; send start bit
1026     ;
1027     tx1:               mov     r5,#170               ; bit const
1028     tx2:               djnz    r5,tx2                ; wait a bit
1029                        rlc     a; msb first
1030                        mov     net_bit_out,c
1031                        djnz    r4,tx1
1032                        mov     r5,#170               ; wait one more bit time after
1033     tx3:               djnz    r5,tx3                ; sending stop bit (H)
1034                        mov     c,net_bit_in          ; check for ACK
1035                        cpl     c                     ; low means ACK-convert to hi means ACK
1036                        mov     ack,c                 ; copy into flag
1037                        ret
1038     ;
1039     ;--------------------------
1040     ; Play a melodic fragment, call with dptr pointing
1041     ; to note table
1042     ;--------------------------
1043     ditty:             mov     r3,#0
1044                        mov     tempo,#halfsec/6
1045                        acall   enable_tempo_timer
1046                        setb    TR
1047     tu1:               mov     a,r3
1048                        clr     c
1049                        rlc     a
                            push    acc
                            movc    a,@a+DPTR
                            mov     rth,a
                            mov     TH,a
                            pop     acc
                            inc     a
                            movc    a,@a+DPTR
                            mov     rtl,a
                            mov     TL,a
1059     tu2:               jnb     beat,tu2
1060                        clr     beat
1061                        inc     r3
1062                        mov     a,r3
1063                        cjne    a,#7,tu1
1064                        clr     TR; timer off
```

```
1065                    setb    spkr_bit            ; spkr off
1066                    cl      rTlrun
1067                    ret
1068           ;
1069           ;————
1070           ; Make a razz sound
1071           ;————
1072           razz:           mov     rth,#$F2
1073                           mov     TH,#$F2
1074                           mov     rtl,#$3C
1075                           mov     TL,#$3C
1076                           setb    TR; spkr on
1077                           mov     r5,#bigdel          ; wait a bit
1078                           acall   delay
1079                           clr     TR
1080                           setb    spkr_bit            ; spkr off
1081                           ret
1082           ;————
1083           ; Beep out the score
1084           ;————
1085           beep_score:     mov     a,score
1086                           cjne    a,#0,bx             ; skip a score of 0
1087                           ret
1088           ;
1089           bx:             mov     r5,#bigdel          ; build up the suspense
1090                           acall   delay
1091                           mov     r3,#0               ; score counter
1092           beeploop:
1093                           mov     a,r3
1094                           mov     b,#7
1095                           div     ab                  ; pitch increases every "sweep"
1096                           clr     c                   ; a=Quotient
1097                           rlc     a                   ; times 2 for word access
1098                           mov     b,a                 ; save offset
1099                           mov     dptr,#k1
1100                           movc    a,@a+dptr           ; hi divisor
1101                           mov     TH,a
1102                           mov     rth,a
1103                           mov     a,b                 ; get offset back
1104                           inc     a                   ; inc to low byte
1105                           movc    a,@a+dptr           ; get low pitch byte
1106                           mov     TL,a
1107                           mov     rtl,a
1108           ;
1109                           mov     tempo,#score_tempo
1110                           acall   enable_tempo_timer
1111                           setb    TR                  ; pitch timer on-make a beep
1112                           mov     a,r3                ; update the lights
1113                           mov     b,#14
1114                           div     ab
1115                           mov     a,b
1116                           mov     dptr,#lites
1117                           movc    a,@a+dptr
1118                           mov     p3,a; one light on
1119           wx1:            mov     pcon,#1             ; zzzzzzzzzzzzzz
1120                           jnb     beat,wx1            ; wait for beat
1121                           clr     beat
1122                           clr     TR                  ; sound off
1123                           setb    spkr_bit
```

```
1124    wx2:              mov      pcon,#1
1125                      jnb      beat,wx2              ; wait for rest to end
1126                      clr      beat
1127                      inc      r3
1128                      mov      a,r3
1129                      cjne     a,score,beeploop
1130                      mov      r5,#$0E               ; leave score light on
1131                      acall    delay                 ; ..just long enough to savor...
1132                      mov      p3,#0FFh              ; lites out
1133    wx3:              ret
1134    ;————————————————
1135    ; Delay: call with delay constant in R5
1136    ;————————————————
1137    delay:            mov      tempo,#halfsec/5
1138                      acall    enable_tempo_timer
1139                      setb     ETI                   ; enable timerl interrupt
1140    del1:             mov      pcon,#1               ; zzzzzzzzzzzzzz
1141                      jnb      beat,del1             ; wake up here
1142                      clr      beat
1143                      djnz     r5,del1
1144                      clr      ETI                   ; disable timerl interrupt
1145                      clr      TIrun                 ; turn off & clear timerl
1146                      ret
1147    ;————————————————
1148    Zip:
1149    ;————————————————
1150    ; Uses R0
1151    ;
1152                      mov      rth,#$FA
1153                      mov      TH,#$FA
1154                      mov      rtl,#$00
1155                      mov      TL,#$00
1156                      mov      r0,#20                ; this many steps
1157                      setb     TR                    ; timer on
1158                      mov      tempo,#2
1159                      acall    enable_tempo_timer
1160    z1:               mov      pcon,#1               ; zzzzzzzzzzzz
1161                      jnb      beat,z1               ; wait for "beat" interrupt
1162                      clr      beat
1163                      mov      a,rtl
1164                      add      a,#$44
1165                      mov      rtl,a
1166                      jnc      noflo
1167                      inc      rth
1168    noflo:            djnzr0,z1
1169                      clrTR
1170                      setbspkr_bit
1171                      ret
1172    ;
1173    ;————————————————
1174    ; Reset tempo timer
1175    ;————————————————
1176    enable_tempo_timer: clr    TIRun                 ; reset the timer
1177                      mov      r7,tempo              ; initialize TITimer Intr. counter
1178                      clr      beat                  ; clear beat flag
1179                      setb     TIRun                 ; start the timer
```

```
1180                    setb    ETI                     ; enable Timer1 interrupt
1181                    ret
1182    ;——
1183    play_a_note:
1184    ;——
1185    ; Call with note number in note_value.
1186    ; Play the note and turn on the appropriate light,
1187    ; only if with.lites flag=1 then play a
1188    ; rest with the lights off. Uses a,r0,r1,dptr.
1189    ;
1190                    clr     beat
1191                    clr     rest                    ; reset rest flag
1192                    mov     a,round                 ; 0-27
1193                    mov     dptr,#interval_table
1194                    movc    a,@a+dptr               ; a now = scale offset
1195                    mov     b,a                     ; temp
1196                    mov     a,note_value
1197                    jb      bach_round,pn2          ; don't use interval if bach round
1198                    movc    a,@a+dptr               ; 0-7 -> 0-11
1199    pn2:            add     a,b                     ; a=note number
1200                    mov     b,#12
1201                    div     ab                      ; a=Q, b=R
1202                    mov     r1,a                    ; r1=quotient
1203                    mov     dptr,#pitch_table
1204                    mov     a,b                     ; a=Remainder
1205                    clr     c
1206                    rlc     a                       ; times 2 for word table entries
1207                    mov     r0,a                    ; r0=temp
1208                    movc    a,@a+dptr               ; get msbyte
1209                    mov     b,a                     ; b=msb
1210                    mov     a,r0                    ; get pointer
1211                    inc     a                       ; go to lsbyte
1212                    movc    a,@a+dptr               ; a=lsb
1213    ;
1214                    inc     r1                      ; so 0 is 1
1215    pn3:            djnz    r1,div2                 ; don't do for 0 (1)
1216                    sjmp    pn4
1217    div2:           xch     a,b                     ; a=msb, b=lsb
1218                    clr     c
1219                    rrc     a                       ; divide by 2
1220                    xch     a,b                     ; a=lsb, b=msb
1221                    rrc     a
1222                    djnz    r1,div2
1223    pn4:            cpl     a                       ; store complemented values
1224                    mov     rtl,a
1225                    mov     TL,a
1226                    mov     a,b                     ; get msb
1227                    cpl     a
1228                    mov     rth,a
1229                    mov     TH,a
1230    ;
1231    ; Update the lites if with_lights flag is 1
1232    ;
1233    contpn:         setb    TR                      ; start Timer0
1234                    jnb     with_lites,wait
1235                    mov     dptr,#lites             ; normal light table
1236                    mov     a,note_value
1237                    jnb     bach_round,norm         ; don't overwrite dptr
1238                    mov     dptr,#bach_lites        ; do
```

```
1239   norm:              movc    a,@a+DPTR          ; turn on a light
1240                      mov     p3,a
1241   ;
1242   ; leave note on until beat flag=1
1243   ;
1244   wait:              mov     pcon,#1            ; zzzzzzzzzzzz
1245                      jnb     beat,wait
1246                      clr     beat               ; clear the flag
1247                      setb    rest               ; set rest flag
1248   ;
1249   ; Play a rest (same duration as note), turn off lites
1250   ;
1251                      clr     TR                 ; stop the timer
1252                      setb    spkr_bit           ; spkr OFF
1253                      mov     p3,#0FFh           ; lites off
1254   wait2:              mov     pcon,#1            ; zzzzzzzzzzzz
1255                      jnb     beat,wait2         ; any interrupt takes us here
1256                      clr     beat
1257                      ret                        ; all done
1258   ;
1259   ;--------------------
1260   ; Update Stream
1261   ; Call with new note value in note_val
1262   ;--------------------
1263   update_stream:     mov     s1,s2
1264                      mov     s2,s3
1265                      mov     s3,s4
1266                      mov     s4,note_value
1267                      ret
1268   ;--------------------
1269   ; Hit_miss
1270   ; Update the 2 msb's of score_byte
1271   ; First check R6 for 0: notes ran out
1272   ; without a push.  This overrides the
1273   ; routine and sets score_byte to $80
1274   ; (miss value), so that if the last
1275   ; three notes happened to match a hit
1276   ; is not erroneously scored.
1277   ; Update hit_bit, miss_bit
1278   ;--------------------
1279   hit_miss:          clr     hit_bit
1280                      clr     miss_bit
1281                      mov     a,r6               ; note counter (counts down to 0)
1282                      jz      miss
1283   ;
1284                      mov     a,n3
1285                      cjne    a,s3,no_hit
1286                      mov     a,n2
1287                      cjne    a,s2,no_hit
1288                      mov     a,n1
1289                      cjne    a,s1,no_hit
1290                      setb    score_byte.6       ; 01 means missed by 1
1291                      ret
1292   ;
1293   no_hit:            mov     a,n1
1294                      cjne    a,s2,miss
1295                      mov     a,n2
1296                      cjne    a,s3,miss
1297                      mov     a,n3
```

```
1298                    cjne    a,s4,miss
1299                    setb    hit_bit          ; a hit!
1300                    ret                      ; 00 means a hit (no mod.)
1301    miss:           mov     score_byte,#$80  ; $80 means a miss
1302                    setb    miss_bit
1303                    ret
1304    ;
1305    ;────────────
1306    ; Random Number Generator
1307    ;────────────
1308    random:         mov     a,randL
1309                    orl     a,randH
1310                    jnz     ok
1311                    mov     randL,#$AA
1312                    mov     randH,#$55
1313    ;
1314    ok:             clrc
1315                    mov     a,randL
1316                    rlc     a
1317                    mov     randL,a
1318                    mov     a,randH
1319                    rlc     a
1320                    mov     randH,a
1321                    jnc     rand_exit
1322                    xrl     randH,#1DH
1323                    xrl     randL,#87H
1324    rand_exit:      mov     a,randL
1325                    ret
1326    ;────────────
1327    ; Reset the random generator
1328    ;────────────
1329    reset_RNG:      mov     randL,seedL
1330                    mov     randH,seedH
1331                    mov     d1,seedL
1332                    mov     d2,seedH
1333                    mov     d3,seedL
1334                    mov     d4,seedH
1335                    mov     mask,seedH
1336                    ret
1337    ;────────────
1338    ; 1/f noise generator
1339    ;────────────
1340    ; Returns with note value
1341    ; in a, also in note_value
1342    ;
1343    die_ptr         equ     0                ; R0
1344    die_ctr         equ     1                ; R1
1345    shift_mask      equ     2                ; R2
1346    ;
1347    oof:            mov     die_ptr,#D1      ; point to die #1
1348                    mov     die_ctr,#4       ; loop counter
1349                    mov     a,mask
1350                    inc     mask
1351                    xrl     a,mask
1352                    mov     shift_mask,a
1353    ;
1354    toss:           mov     a,shift_mask
1355                    rrc     a
1356                    mov     shift_mask,a
```

```
1357                    jnc     again
1358                    acall   random
1359                    anl     a,#07h
1360                    mov     @r0,a              ; (r0=die_ptr) update the die
1361    again:          inc     die_ptr            ; point to next die
1362                    djnz    die_ctr,toss       ; go again
1363    ;
1364    ; Sum the 4 dice
1365    ;
1366                    mov     die_ptr,#d1
1367                    mov     die_ctr,#4
1368                    clr     a
1369    add_loop:       add     a,@r0              ; (r0=die_ptr)
1370                    inc     die_ptr
1371                    djnz    die_ctr,add_loop
1372                    anl     a,#07H
1373                    mov     note_value,a
1374                    ret
1375    ;
1376    ;——
1377    ; Tables
1378    ;——
1379    ;
1380    pitch_table:    dw      30Fh               ;C
1381                    dw      2E3h               ;C#
1382                    dw      2B9h               ;D
1383                    dw      292h               ;Eb
1384                    dw      26Dh               ;E
1385                    dw      24Ah               ;F
1386                    dw      22Ah               ;F#
1387                    dw      20Ah               ;G
1388                    dw      1EDh               ;Ab
1389                    dw      1D1h               ;A
1390                    dw      1B7h               ;Bb
1391                    dw      19Fh               ;B
1392    ;
1393    ;————————
1394    lites:          db      11111110b          ; 0
1395                    db      11111101b          ; 1
1396                    db      11111011b          ; 2
1397                    db      11110111b          ; 3
1398                    db      11101111b          ; 4
1399                    db      11011111b          ; 5
1400                    db      10111111b          ; 6
1401                    db      01111111b          ; 7
1402                    db      10111111b          ; 8
1403                    db      11011111b          ; 9
1404                    db      11101111b          ; 10
1405                    db      11110111b          ; 11
1406                    db      11111011b          ; 12
1407                    db      11111101b          ; 13
1408    ;
1409    interval_table: db      0                  ; for equally tempered scale
1410                    db      2
1411                    db      4
1412                    db      5
1413                    db      7
1414                    db      9
```

```
1415                db    11
1416    ;
1417                db    12
1418                db    14
1419                db    16
1420                db    17
1421                db    19
1422                db    21
1423                db    23
1424    ;
1425                db    24
1426                db    26
1427                db    28
1428                db    29
1429                db    31
1430                db    33
1431                db    35
1432    ;
1433                db    36
1434                db    38
1435                db    40
1436                db    41
1437                db    43
1438                db    45
1439                db    47
1440    ;
1441                db    48
1442
1443    ;
1444    ;
1445    k1:         dw    0FE78H        ; 523 C
1446    k2:         dw    0FEC8H        ; 659 E
1447    k3:         dw    0FEFAH        ; 784 G
1448    k4:         dw    0FF3BH        ; 1047 C
1449    k5:         dw    0FF64H        ; 1319 E
1450    k6:         dw    0FF7CH        ; 1568 G
1451    k7:         dw    0FF9DH        ; 2093 C
1452    k8:         dw    0FFCEH        ; 4186 C
1453    ;
1454    score_table:
1455    ; ─────────────────────
1456    ; Format: upper 4-bits = score with lites off,
1457    ;  lower 4-bits = score with lites on
1458    ; 2 entries: first for hit, second for miss by 1
1459    ; ─────────────────────
1460    ;
1461                db    $32           ; round 1
1462                db    $21
1463                db    $32           ; round 2
1464                db    $21
1465                db    $32           ; round 3
1466                db    $21
1467                db    $32           ; round 4
1468                db    $21
1469                db    $32           ; round 5
1470                db    $21
1471                db    $32           ; round 6
1472                db    $21
```

```
1473              db    $32              ; round 7
1474              db    $21
1475              db    $32              ; round 8
1476              db    $21
1477      ;
1478              db    $43              ; round 9
1479              db    $21
1480              db    $43              ; round 10
1481              db    $21
1482              db    $53              ; round 11
1483              db    $32
1484              db    $53              ; round 12
1485              db    $32
1486              db    $63              ; round 13
1487              db    $32
1488              db    $63              ; round 14
1489              db    $32
1490              db    $63              ; round 15
1491              db    $32
1492              db    $74              ; round 16
1493              db    $32
1494      ;----
1495      end_tune:
1496      ;----
1497              dw    $FE98
1498              dw    $FE83
1499              dw    $FE98
1500              dw    $FE3B
1501              dw    $0000            ; rest
1502              dw    $FE98
1503              dw    $FD59
1504      ;----
1505      warn_tune:
1506      ;----
1507              dw    $FCF0
1508              dw    $FE78
1509              dw    $FF3C
1510              dw$   FF9E
1511      ;
1512      ;----
1513      bach_melody:
1514      ;----
1515              db    1
1516              db    8
1517              db    17
1518              db    15
1519              db    17
1520              db    8
1521              db    17
1522              db    8
1523      ;
1524              db    1
1525              db    10
1526              db    18
1527              db    17
1528              db    18
1529              db    10
1530              db    18
1531              db    10
```

```
1532              ;
1533                        db     1
1534                        db     12
1535                        db     18
1536                        db     17
1537                        db     18
1538                        db     12
1539                        db     18
1540                        db     12
1541              ;
1542                        db     1
1543                        db     13
1544                        db     17
1545                        db     15
1546                        db     17
1547                        db     13
1548                        db     17
1549                        db     13
1550              ;─────────────────────────────
1551              ; Translate the eight bach notes into sequential lites.
1552              ; Notes in scale that are used shown with (*).
1553              ;─────────────────────────────
1554              bach_lites:     db     11111111b          ; note 0
1555                              db     11111110b          ; note 1*
1556                              db     11111111b          ; note 2
1557                              db     11111111b          ; note 3
1558                              db     11111111b          ; note 4
1559                              db     11111111b          ; note 5
1560                              db     11111111b          ; note 6
1561                              db     11111111b          ; note 7
1562                              db     11111101b          ; note 8 *
1563                              db     11111111b          ; note 9
1564                              db     11111011b          ; note 10*
1565                              db     11111111b          ; note 11
1566                              db     11110111b          ; note 12*
1567                              db     11101111b          ; note 13*
1568                              db     11111111b          ; note 14
1569                              db     11011111b          ; note 15*
1570                              db     11111111b          ; note 16
1571                              db     10111111b          ; note 17*
1572                              db     01111111b          ; note 18*
1573              ;
1574                        END
1575
```

What is claimed is:

1. An electronic game device, comprising:

melody means for generating a sequence of melody signals indicative of a musical melody having a sequence of N number of musical notes to be generated during game play;

said melody means for generating prior to said game play, a series of preview signals indicative of a preview recognition sequence having a predetermined M number of musical notes, where M is substantially less than N;

said musical melody of N number of musical notes including said preview recognition sequence of M number of musical notes;

note indicating means responsive to said sequence of melody signals for generating a user perceptible indication of individual ones of said sequence of said N number of musical notes to permit user recognition of said preview recognition sequence of M number of musical notes during said sequence of N number of musical notes generated during game play in accordance with game rules;

said note indicating means further responsive to said series of preview signals for generating a user perceptible indication of individual ones of said sequence of said M number of musical notes only to facilitate user recognition of the individual ones of the predetermined M number of musical notes of said preview recognition sequence prior to said game play in accordance with game rules;

user actuation means for causing said melody means to generate said preview recognition sequence to facilitate user memorization of said preview recognition sequence prior to game play in accordance with game rules;

game initiation means for causing said melody means to generate said sequence of melody signals following said preview recognition sequence;

said user actuation means responsive to the user during said sequence of melody signals for generating a stop signal when the user perceives the occurrence of musical notes corresponding to the preview recognition sequence during said musical melody in accordance with game rules; and means responsive to said stop signal for determining that it occurred substantially concurrently with the generation of M number of musical notes corresponding to the preview recognition sequence of M number of musical notes.

2. An electronic game device according to claim 1, further comprising:

means for generating a user perceptible award signal indicative of user recognition of said preview recognition sequence during said sequence of melody signals.

3. An electronic game device according to claim 1, wherein said note indicating means includes means responsive to said award signal for generating a user perceptible indication of user recognition of said preview recognition sequence within at least one predetermined period of time.

4. An electronic game according to claim 1, wherein said preview recognition sequence of M number of musical notes is a series of M consecutive musical notes.

5. An electronic game according to claim 1, wherein said series of M number of consecutive musical notes is a series of M consecutive musical notes selected randomly from said N number of musical notes.

6. An electronic game according to claim 1, wherein said note indicating means is audible means for generating audible sounds indicative of musical notes.

7. An electronic game according to claim 1, wherein said note indicating means is visual means for generating a visually perceptible light sequence indicative of musical notes.

8. An electronic game according to claim 1, wherein said melody means includes memory means for storing X substantially different musical melodies and means for controlling game play.

9. An electronic game according to claim 8, wherein means for controlling is microprocessor means and wherein said melody means is responsive to said microprocessor means for selecting an individual one of the X substantially different musical melodies for game playing purposes.

10. An electronic game according the claim 9, wherein said microprocessor means includes means for generating a fault signal indicative of user failure to recognize said preview recognition sequence within said predetermined period of time.

11. An electronic game according to claim 10, wherein said note indicating means includes:

audible means for generating audible sounds indicative of the N musical notes in said musical melody or the M musical notes in said preview recognition sequence; and user selectable visual means for generating visually perceptible light sequences indicative of the N number of notes in said musical melody or the M number of notes in said preview recognition sequence.

12. An electronic game according to claim 11, further comprising switch means for selecting whether or not said visual means will be enabled during said sequence of melody signals.

13. An electronic game according to claim 12, further comprising:

scoring means responsive to said award signal, and to said fault signal for generating a score signal indicative of the success or failure of a player to recognize said preview recognition sequence within said predetermined period of time.

14. An electronic game according to claim 13, wherein said note indicating means is responsive to said score signal for generating a player perceptible score indicative of the success or failure to recognize said preview recognition sequence within said predetermined period of time.

15. An electronic game device according to claim 8, wherein said user actuation means is switch means.

16. An electronic game device according to claim 15, wherein said switch means is a single switch.

17. An electronic game device according to claim 15, wherein said switch means includes a set of switches.

18. An electronic game device according to claim 17, wherein said set of switches includes a "PREVIEW switch for causing said melody means to generate said series of preview signal each time said PREVIEW switch is activated within a predetermined time period during each round of play.

19. An electronic game device according to claim 17, wherein said set of switches includes a START switch for causing said microprocessor means to initiate a single round of play whereby said melody means generates said sequence of melody signals once for defining a single round of play.

20. An electronic game device according to claim 17, wherein said set of switches includes a STOP switch for causing said melody means to terminate generating said sequence of melody signals.

21. An electronic game device according to claim 15, wherein said microprocessor means includes melody preview means responsive to said switch means for causing said melody means to select a musical melody having a given tempo and to generate said preview recognition sequence.

22. An electronic game device according to claim 21, wherein said microprocessor means includes round initiation means responsive to said switch means for causing said melody means to generate said sequence of melody signals once, said melody signals being indicative of the selected musical melody having said given tempo.

23. An electronic game according to claim 22, wherein said microprocessor means includes melody termination means responsive to said switch means for causing said melody means to terminate generating said sequence of melody signals and accuracy means responsive to said melody signals for determining whether a player actuated said switch means within said predetermined period of time following said preview recognition sequence.

24. An electronic game according to claim 23, wherein said microprocessor means terminates game play after a predetermined Y number of rounds of play whenever said player fails to actuate said switch means within said predetermined period of time following said preview recognition sequence.

25. An electronic game according to claim 1, wherein said melody means includes means for generating a melodic sequence of N number of musical notes arranged randomly in a given musical key and having a given tempo.

26. An electronic game according to claim 25, wherein said means for generating includes algorithm means for determining a numerically calculated sequence of random numbers with a spectral density of 1 divided by $f^n$.

27. An electronic game according to claim 26, wherein n equals zero resulting in "white" noise.

28. An electronic game according to claim 26, wherein n equals one resulting in "1/f" noise.

29. An electronic game according to claim 26, wherein n equals two resulting in "Brownian" noise.

30. An electronic game according to claim 1, wherein said melody means includes tempo means for increasing the tempo of said musical melody from one round of play to the next round of play during game play.

31. An electronic game according to claim 1, wherein said melody means includes musical key means for increasing the musical key of said musical melody from one round of play to the next round of play by at least one note.

32. An electronic game according to claim 1, wherein said melody means includes means for controlling game play, said means for controlling game play terminating game play after a predetermined Y number of rounds of play.

33. An electronic game according to claim 32, wherein said predetermined Y number is at least 2.

34. A method of using an electronic game device, comprising:
generating a sequence of melody signals indicative of a musical melody having N number of musical notes;
generating a series of preview signals indicative of a preview recognition sequence of M number of musical notes selected from said N number of musical notes; where M is substantially less than N;
generating a user perceptible indication of individual ones of said N number of musical note and individual ones of the M number of musical notes to facilitate user recognition of said musical melody and said preview recognition sequence;
generating an award signals indicative of user recognition of said preview recognition sequence during said sequence of melody signals; and
generating a user perceptible indication of user recognition of said preview recognition sequence within a predetermined period of time.

35. A method according to claim 34 wherein said step of generating a sequence of melody signals includes determining a numerically calculated sequence of random numbers with a spectral density of 1 divided by $F^n$ to establish a random sequence of melody signals.

36. An electronic game arrangement, comprising:
a plurality of like electronic game units;
each individual one of said plurality of game units including:
communication means to enable said plurality of like electronic game units to transmit and receive data between one another for game playing purposes;
master assertion means for generating randomly prior to game play a master request signal having a master time interval and for causing said communication means to transmit'said request signal to the other like game units;
master slave means responsive to said request signal for setting a master flag after said master time interval if another master request signal from another like unit is not received and for setting a slave flag if another master request signal from another like unit is received;
said master flag indicative that the unit is the master unit and said slave flag indicative that the unit is a slave unit;
slave determination means responsive to said master flag for generating an arbitration signal to enable the master unit to determine the number of slave units available for game play;
said arbitration Signal being transmitted to all slave units and being indicative of a unique address assignment for a single slave unit only;
slave request means responsive to said arbitration signal for generating randomly prior to game play a slave request signal having a slave time interval;
slave acknowledgement mean for accepting said address assignment and for causing said communication means to transmit an acknowledgement signal indicative that the transmitted address assignment has been assumed if another slave request signal is not received during said slave time interval and for rejecting said address assignment if another slave request signal is received during said slave time interval;
said slave determination means responsive to said acknowledgement signal for generating another arbitration signal having another unique address assignment and for generating a game initialization signal when no acknowledgement signal is received to synchronize said plurality of like game units to enable simultaneous play; and user perceptible indication means for facilitating user recognition of game playing conditions.

37. An electronic game arrangement according to claim 36, wherein said communication means is wireless communication means.

38. An electronic game arrangement according to claim 36, wherein said communication means includes a single pair of electrical conductors.

* * * * *